(12) United States Patent
Kimura

(10) Patent No.: US 8,873,155 B2
(45) Date of Patent: Oct. 28, 2014

(54) ZOOM LENS AND IMAGE PICKUP APPARATUS HAVING THE SAME

(71) Applicant: Canon Kabushiki Kaisha, Tokyo (JP)

(72) Inventor: Tomonori Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/953,906

(22) Filed: Jul. 30, 2013

(65) Prior Publication Data
US 2014/0036136 A1 Feb. 6, 2014

(30) Foreign Application Priority Data
Jul. 31, 2012 (JP) .................................. 2012-169521

(51) Int. Cl.
*G02B 15/14* (2006.01)

(52) U.S. Cl.
USPC ........... 359/676; 359/683; 359/684; 359/685; 359/686; 359/687; 359/713; 359/714; 359/715; 359/740; 359/756; 359/757; 359/758; 359/759; 359/763; 359/764; 359/766; 359/771; 359/773; 359/774

(58) Field of Classification Search
USPC ......... 359/676, 683–687, 713–715, 740, 756, 359/757–759, 763, 764, 766, 771–774
See application file for complete search history.

(56) References Cited

U.S. PATENT DOCUMENTS

| | | | | |
|---|---|---|---|---|
| 7,885,013 B2* | 2/2011 | Satori | ........................... | 359/687 |
| 7,933,074 B2* | 4/2011 | Takano et al. | ................. | 359/687 |
| 7,952,810 B2* | 5/2011 | Bito et al. | ..................... | 359/676 |
| 8,149,517 B2* | 4/2012 | Ohashi | .......................... | 359/687 |
| 8,149,522 B2* | 4/2012 | Mihara | .......................... | 359/716 |
| 8,164,674 B2* | 4/2012 | Imamura et al. | ............... | 359/687 |
| 8,179,610 B2* | 5/2012 | Takano et al. | ................. | 359/687 |
| 2008/0252992 A1* | 10/2008 | Bito et al. | ..................... | 359/683 |
| 2008/0285150 A1* | 11/2008 | Souma | .......................... | 359/690 |
| 2009/0059387 A1* | 3/2009 | Wada | ............................. | 359/683 |
| 2009/0080088 A1* | 3/2009 | Ohashi | .......................... | 359/687 |
| 2009/0231726 A1* | 9/2009 | Nanba | ........................... | 359/687 |

FOREIGN PATENT DOCUMENTS

| | | |
|---|---|---|
| JP | 2001194586 A | 7/2001 |
| JP | 2010032700 A | 2/2010 |
| JP | 2011002503 A | 1/2011 |

\* cited by examiner

*Primary Examiner* — Evelyn A. Lester
(74) *Attorney, Agent, or Firm* — Canon USA Inc. IP Division

(57) ABSTRACT

A zoom lens includes first to third lens units having positive, negative, and positive refractive power, respectively, and a rear lens group having positive refractive power. An aperture stop is arranged between a lens surface of the second lens unit closest to the image side and a lens surface of the third lens unit closest to the image side. The third lens unit includes first and second positive lenses each including an aspheric surface, and a negative lens. In the third lens unit, a refractive index of the first positive lens, and an Abbe number and relative partial dispersion of the second positive lens are appropriately set.

18 Claims, 25 Drawing Sheets

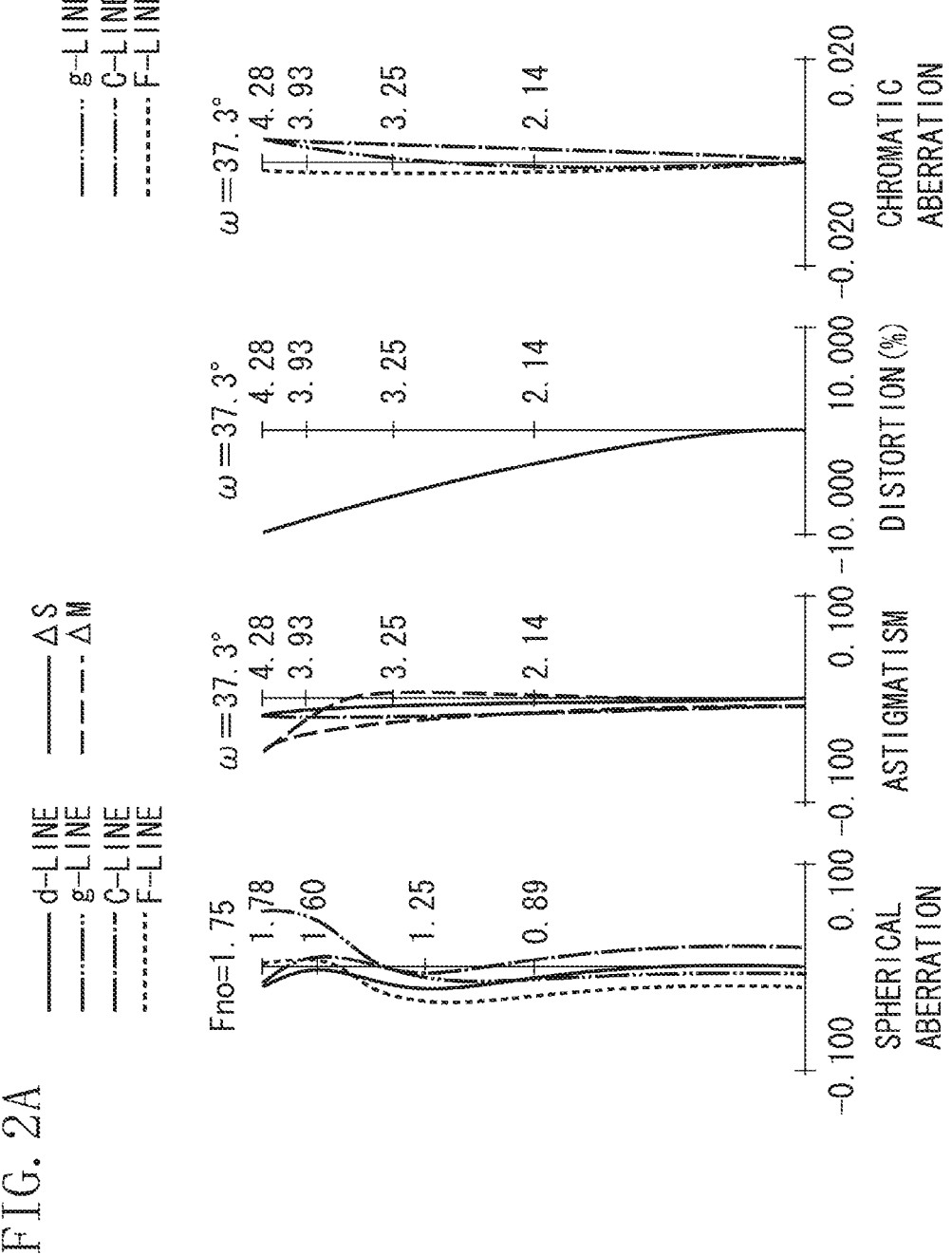

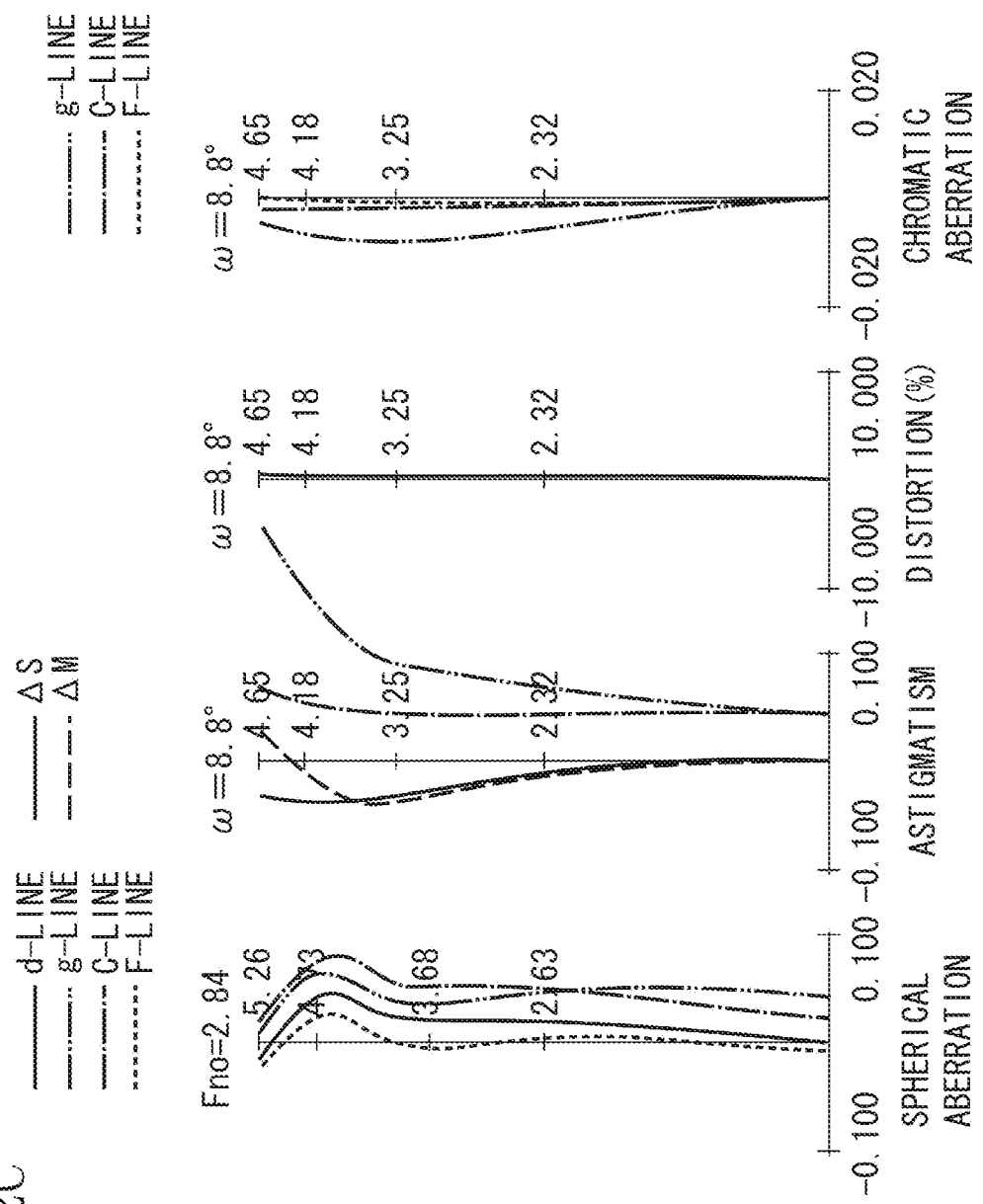

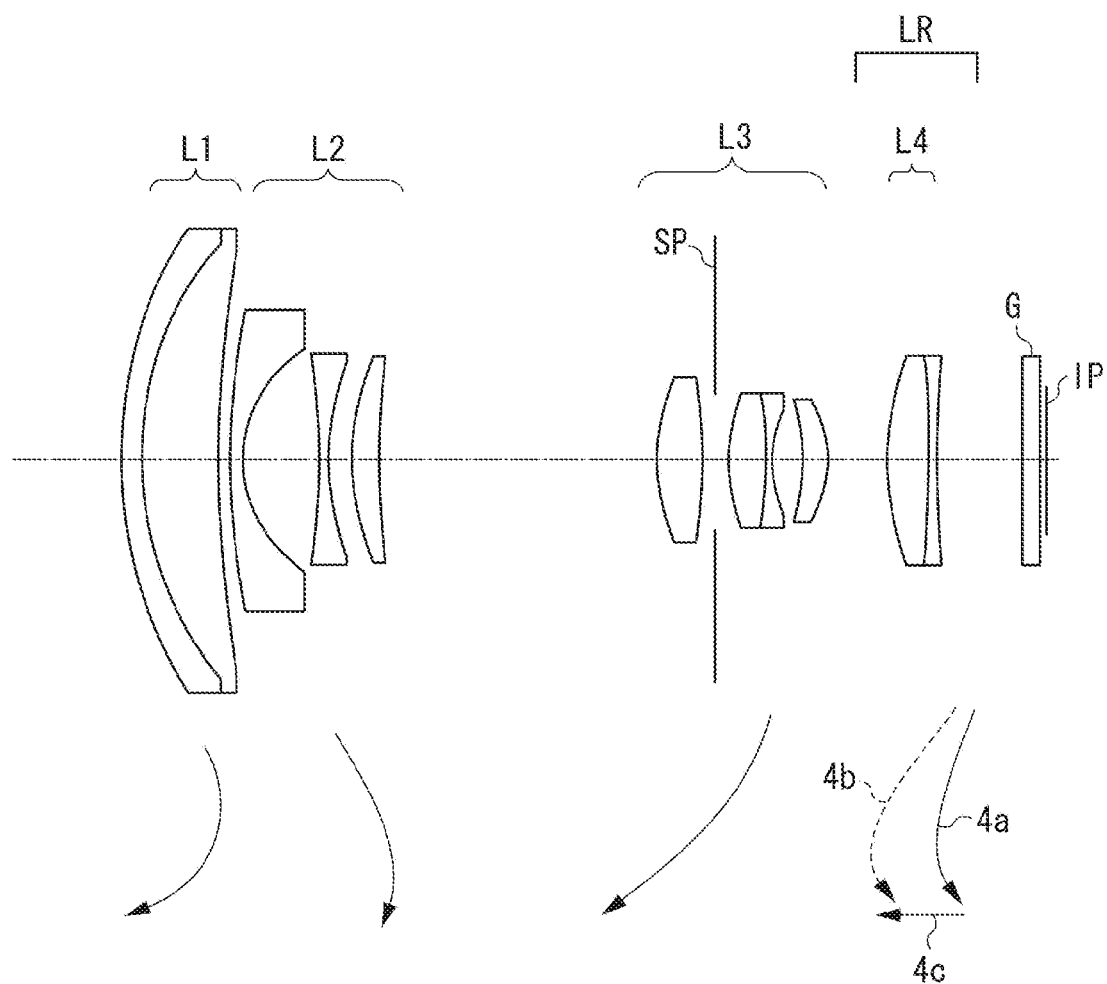

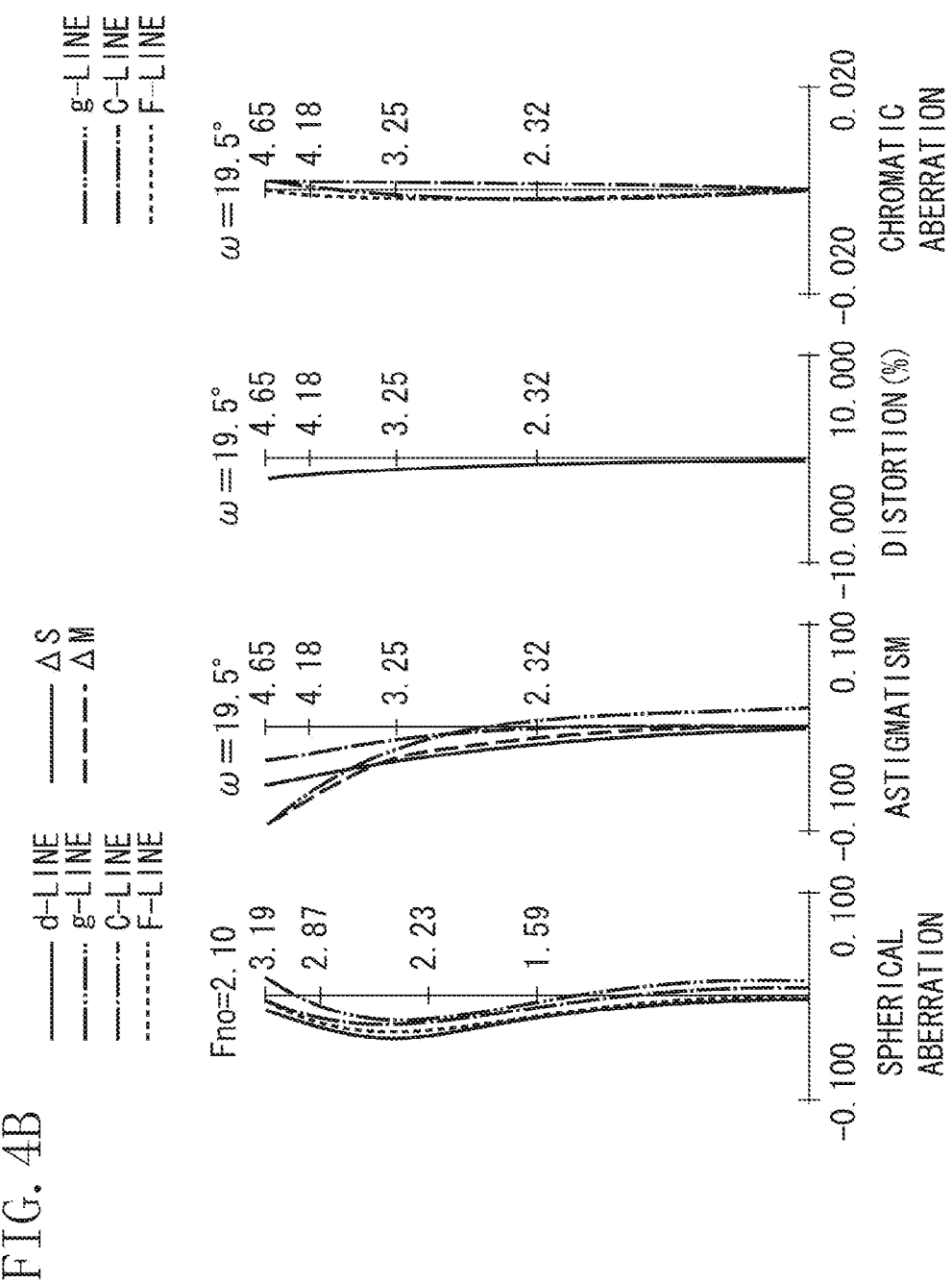

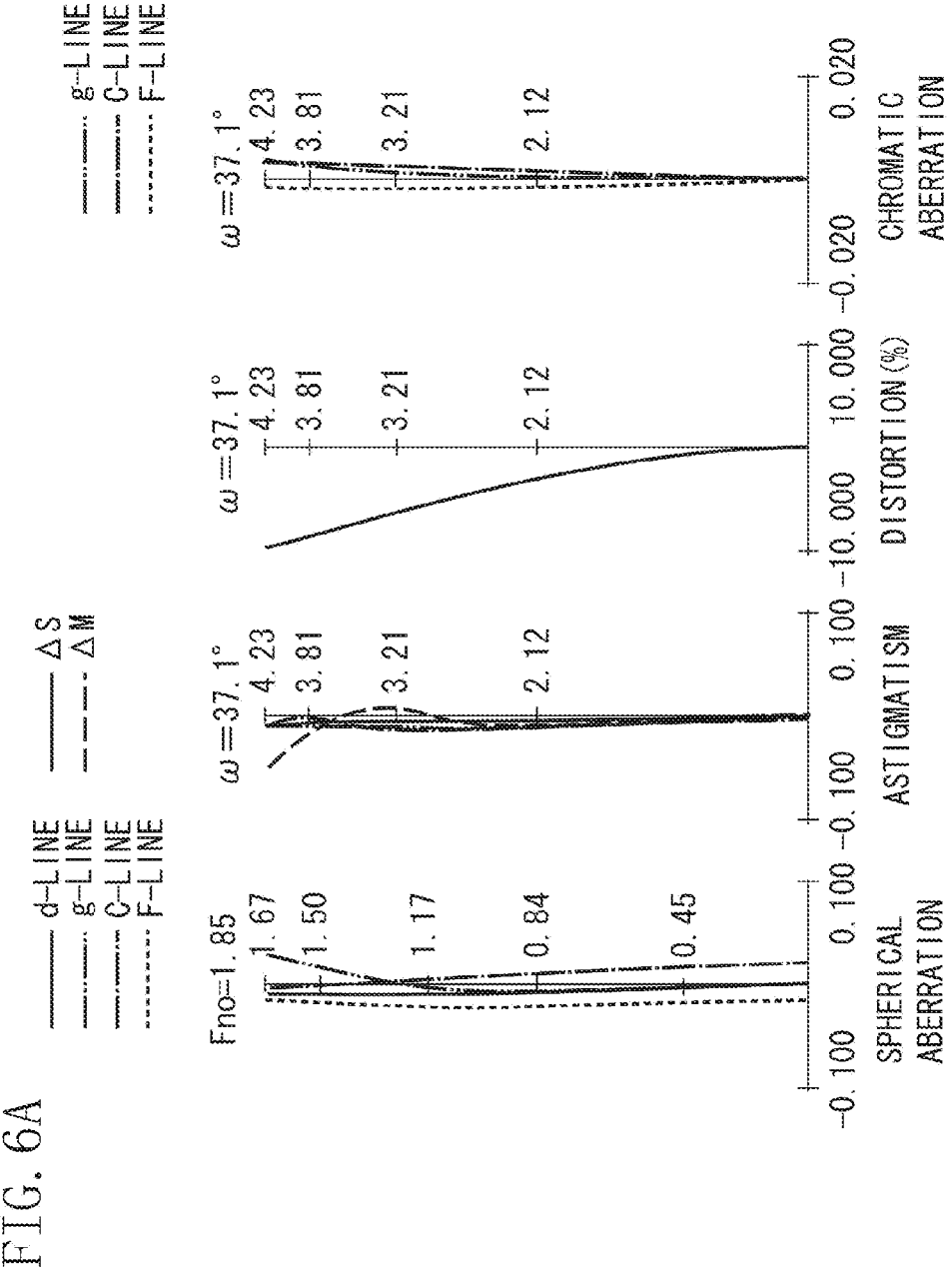

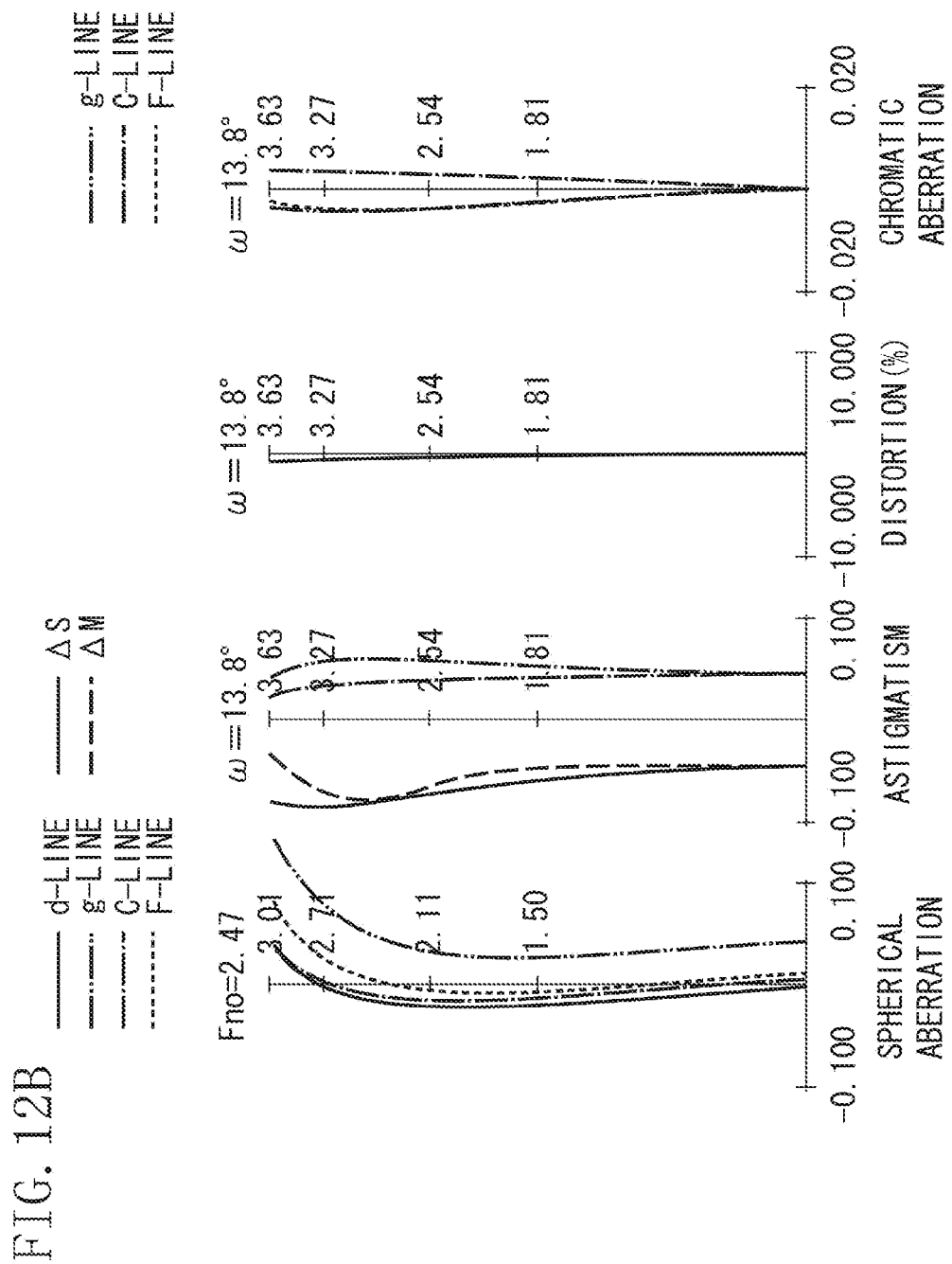

ZOOM LENS AND IMAGE PICKUP APPARATUS HAVING THE SAME

BACKGROUND OF THE INVENTION

1. Field of the Invention

The present invention relates to a zoom lens and an image pickup apparatus including a zoom lens. The zoom lens may be particularly suitable for use in an image pickup apparatus, such as a video camera, a digital still camera, a broadcasting camera, and a monitoring camera, or a camera using a silver-halide film.

2. Description of the Related Art

Deterioration of optical characteristics due to diffraction in a photographic optical system having high resolution is non-negligible. Deterioration of image formation performance due to diffraction is determined by an F-number (Fno) of the photographic optical system. For this reason, the photographic optical system is required to have a small full-aperture Fno. To reduce noise at the time of photography in a dark place, the photographic optical system is required to maintain a small Fno over the entire zoom range.

In a photographic optical system with a small Fno, it is important, in consideration of chromatic aberration, to reduce chromatic spherical aberration equivalent to settlement condition (the degree of condensing) of light at a focus position over the entire visible light region. In addition, it is important to appropriately control axial chromatic aberration, which is equivalent to controlling a difference in focus position at each wavelength.

To maintain a small Fno while realizing a high zoom ratio, the total lens length becomes long, and spherical aberration, axial chromatic aberration, and a change in chromatic spherical aberration upon zooming become large. As a result, it becomes difficult to obtain high optical performance over the entire zoom range. Therefore, it becomes important to optimize the material characteristics (an Abbe number and relative partial dispersion) of lens units constituting a zoom lens.

In a positive lead type zoom lens in which a lens unit having positive refractive power is arranged closest to the object side, it is relatively easy to realize a high zoom ratio, and a change in Fno upon zooming is small.

There is known a zoom lens including, in order from an object side to an image side, a first lens unit having positive refractive power, a second lens unit having negative refractive power, a third lens unit having positive refractive power, and a fourth lens unit having positive refractive power, with an Fno of about 2 or less at a wide-angle end and 3 or less even in the entire zoom range.

Japanese Patent Application Laid-Open No. 2001-194586 discusses a zoom lens with a zoom ratio of 3 and an Fno of 2.06 to 2.74.

Japanese Patent Application Laid-Open No. 2011-2503 discusses a zoom lens with a zoom ratio of about 4, an Fno at a wide-angle end of 1.85, and an Fno at a telephoto end of 2.53 to 2.76.

There is also known a zoom lens including, in order from an object side to an image side, a first lens unit having positive refractive power, a second lens unit having negative refractive power, a third lens unit having positive refractive power, a fourth lens unit having negative refractive power, and a fifth lens unit having positive refractive power (Japanese Patent Application Laid-Open No. 2010-32700).

In a positive lead type zoom lens including four or five lens units, to obtain high optical performance over the entire zoom range, it is important to appropriately set refractive power, a lens configuration, and other parameters of the third lens unit.

In addition, when using an aspheric surface, it becomes important to appropriately set a lens unit having an aspheric surface, the shape of an aspheric surface, and the like.

SUMMARY OF THE INVENTION

The present invention is directed to a zoom lens with the entire zoom lens being compact, and having a high zoom ratio, a small Fno in the entire zoom range, and high optical performance, and is also directed to an image pickup apparatus including the zoom lens.

According to an aspect of the present invention, a zoom lens includes, in order from an object side to an image side, a first lens unit having positive refractive power, a second lens unit having negative refractive power, a third lens unit having positive refractive power, and a rear lens group including one or more lens units. At a telephoto end compared with a wide-angle end, a distance between the first lens unit and the second lens unit becomes larger, a distance between the second lens unit and the third lens unit becomes smaller, and a distance between the third lens unit and the rear lens group changes. The rear lens group has positive refractive power in an entire zoom range from the wide-angel end to the telephoto end, and an aperture stop is arranged between a lens surface of the second lens unit closest to the image side and a lens surface of the third lens unit closest to the image side. The third lens unit includes, in order from the object side to the image side, a first positive lens including an aspheric surface, a second positive lens including an aspheric surface, and a negative lens. When a refractive index of a material of the first positive lens at d-line is nd31, and an Abbe number and relative partial dispersion of a material of the second positive lens are vd32 and θgF32, respectively, conditions below are satisfied:

$$nd31 > 1.63$$

$$vd32 > 63.0$$

$$\theta gF32 + 0.005 \cdot vd32 > 0.5675.$$

Further features of the present invention will become apparent from the following detailed description of exemplary embodiments with reference to the attached drawings.

BRIEF DESCRIPTION OF THE DRAWINGS

FIGS. 2A, 2B, and 2C are aberration diagrams at the wide-angle end, at a middle zoom position, and at a telephoto end, respectively, of the first exemplary embodiment of the present invention.

FIG. 3 is a lens cross-sectional view at a wide-angle end of a second exemplary embodiment of the present invention.

FIGS. 4A, 4B, and 4C are aberration diagrams at the wide-angle end, at a middle zoom position, and at a telephoto end, respectively, of the second exemplary embodiment of the present invention.

FIGS. 6A, 6B, and 6C are aberration diagrams at the wide-angle end, at a middle zoom position, and at a telephoto end, respectively, of the third exemplary embodiment of the present invention.

FIGS. 12A, 12B, and 12C are aberration diagrams at the wide-angle end, at a middle zoom position, and at a telephoto end, respectively, of the sixth exemplary embodiment of the present invention.

DESCRIPTION OF THE EMBODIMENTS

Various exemplary embodiments, features, and aspects of the invention will be described in detail below with reference to the drawings.

A zoom lens according to an exemplary embodiment of the present invention includes, in order from an object side to an image side, a first lens unit having positive refractive power, a second lens unit having negative refractive power, a third lens unit having positive refractive power, and a rear lens group having one or more lens units. The rear lens group has overall positive refractive power over the entire zoom range. At a telephoto end, compared with a wide-angle end, a distance between the first lens unit and the second lens unit becomes larger, a distance between the second lens unit and the third lens unit becomes smaller, and a distance between the third lens unit and the rear lens group changes.

An aperture stop is arranged between a lens surface of the second lens unit closest to the image side and a lens surface of the third lens unit closest to the image side. The third lens unit includes at least two positive lenses and at least one negative lens. Each of the two positive lenses, arranged on the object side, of the third lens unit has an aspheric surface.

Figure 1:
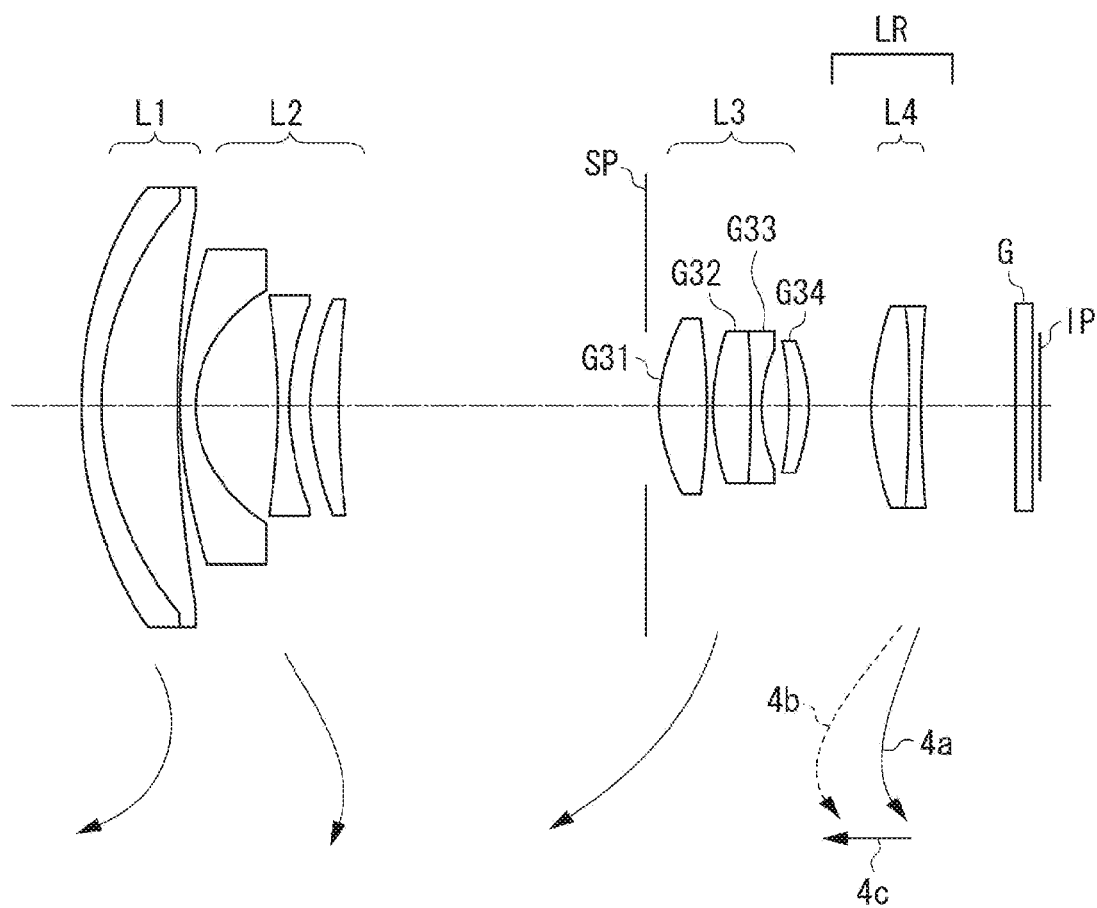
FIG. 1 is a lens cross-sectional view at a wide-angle end of a first exemplary embodiment of the present invention.
Figure 2B:
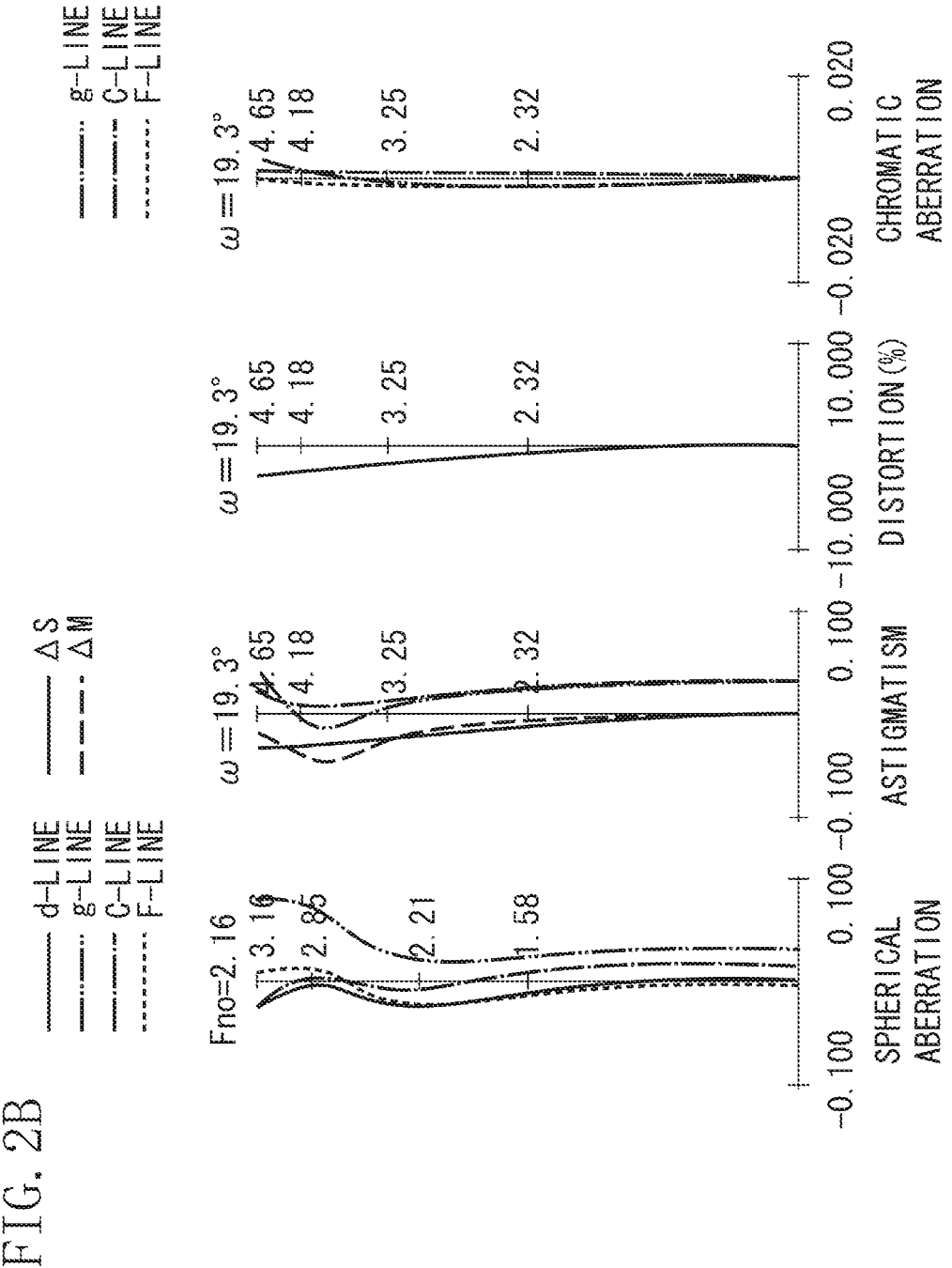
Figure 4A:
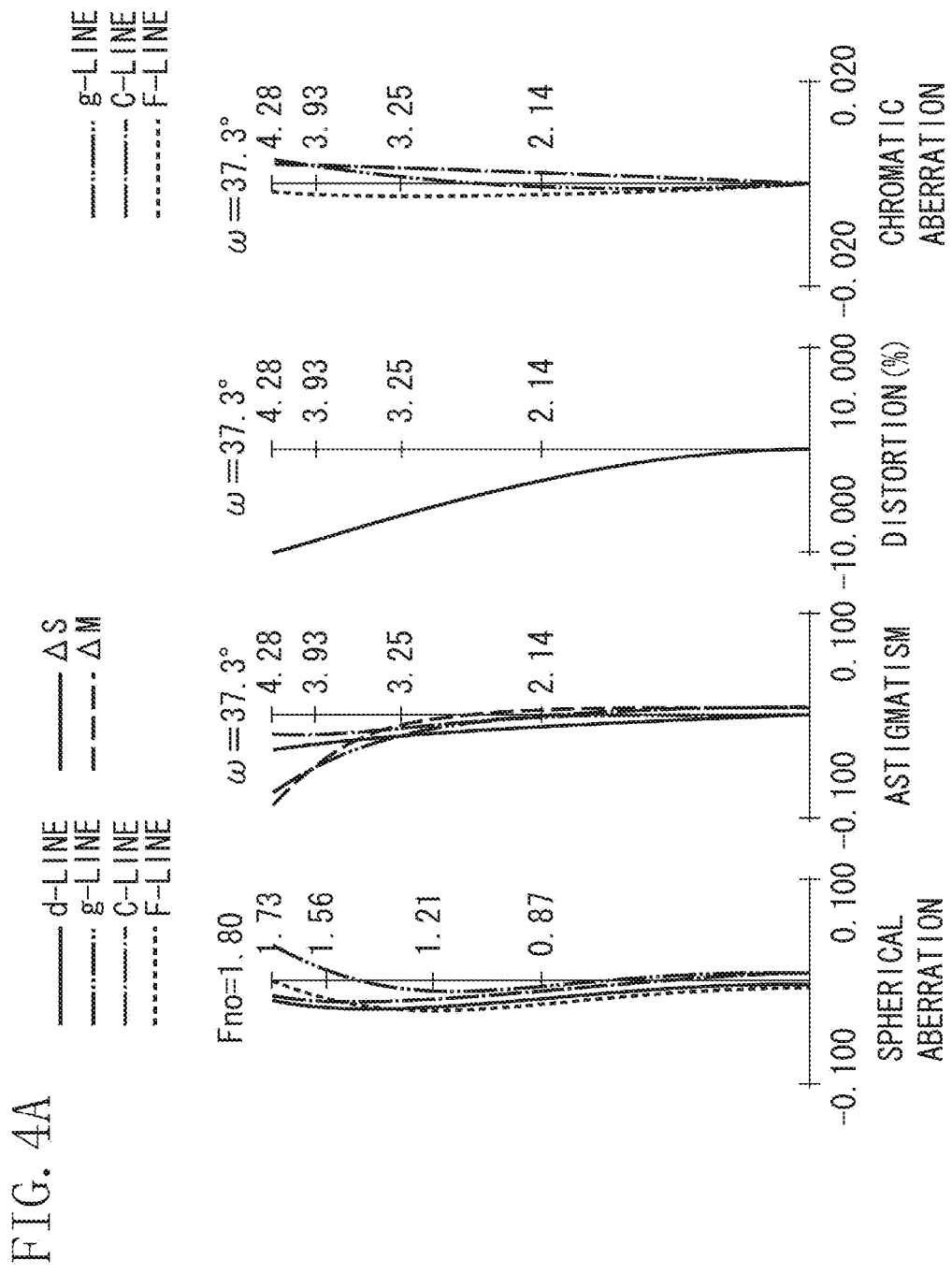
Figure 4C:
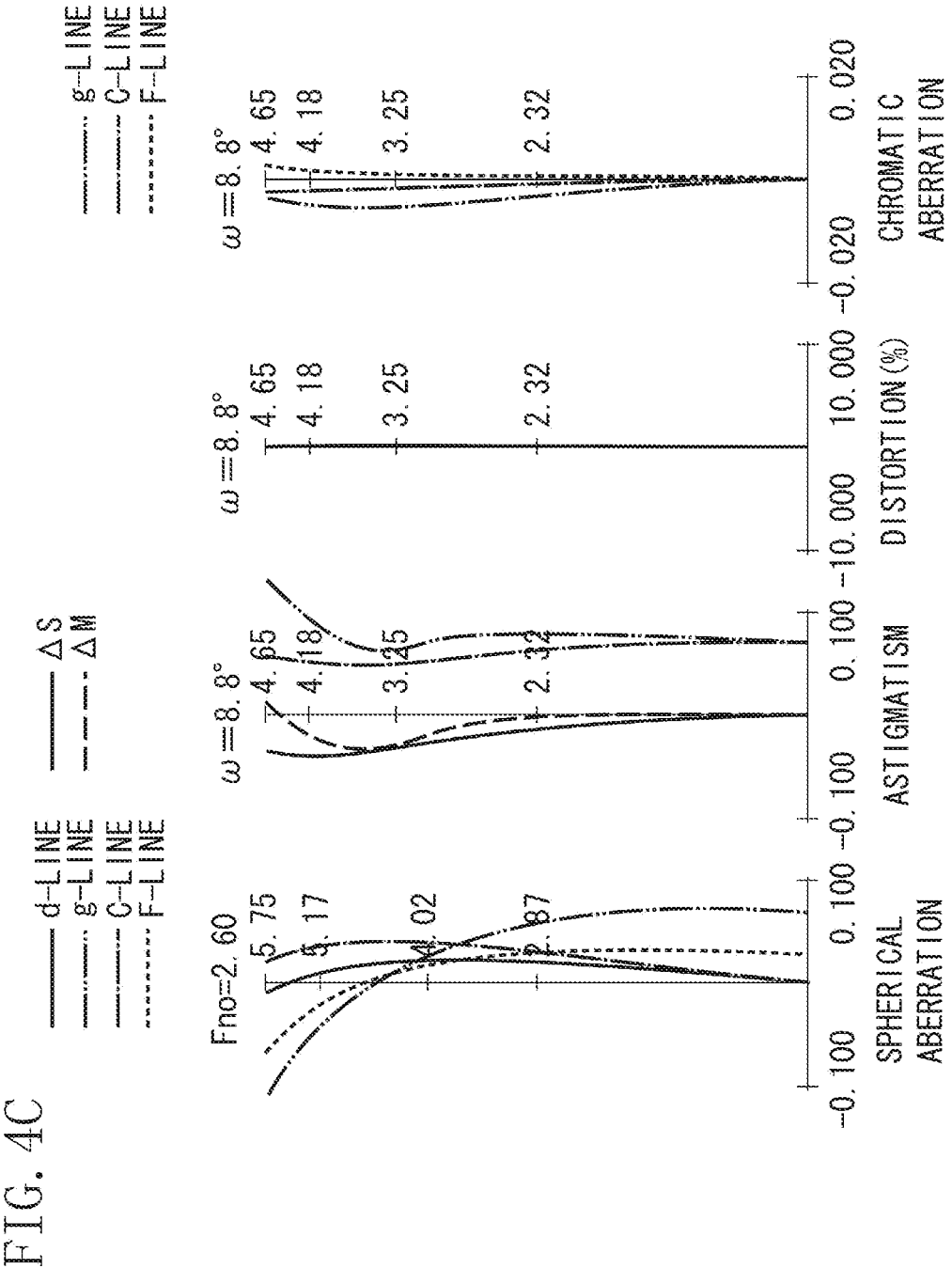
Figure 5:
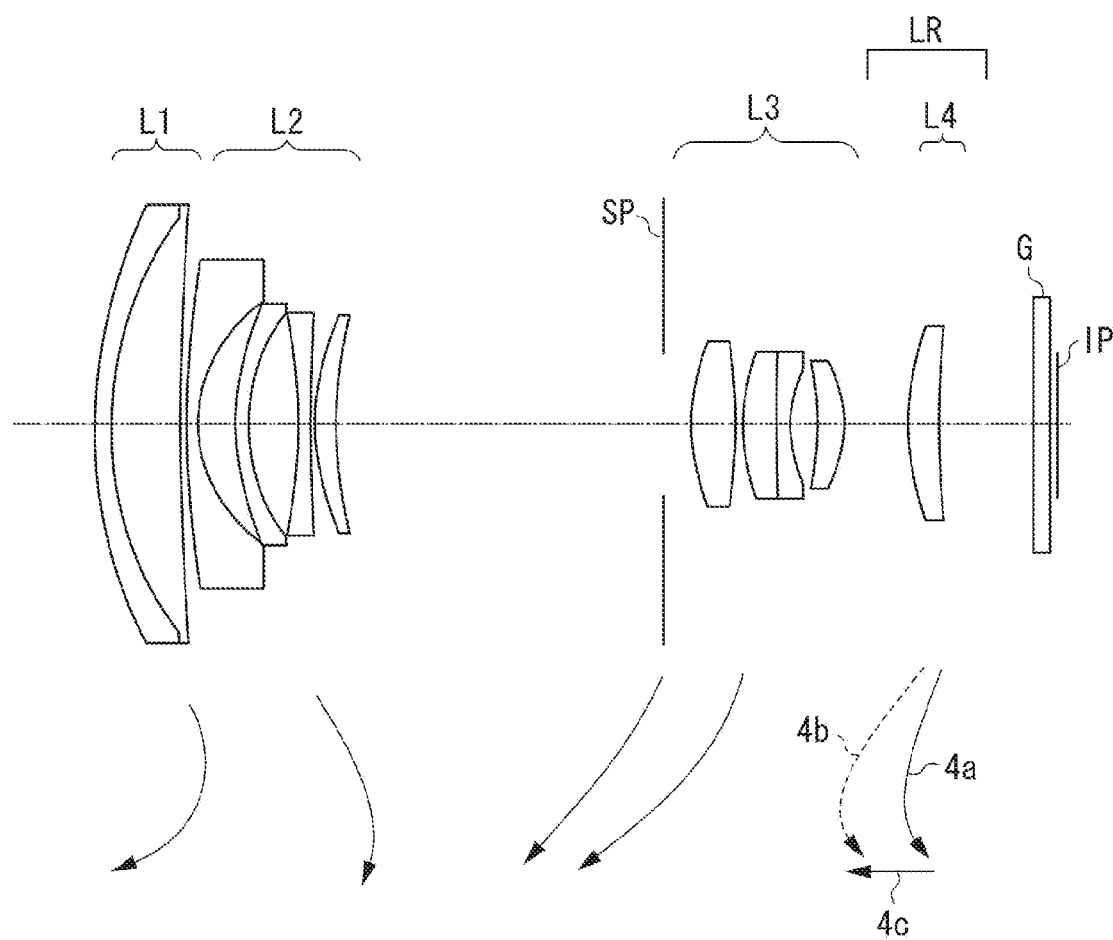
FIG. 5 is a lens cross-sectional view at a wide-angle end of a third exemplary embodiment of the present invention.
Figure 6B:
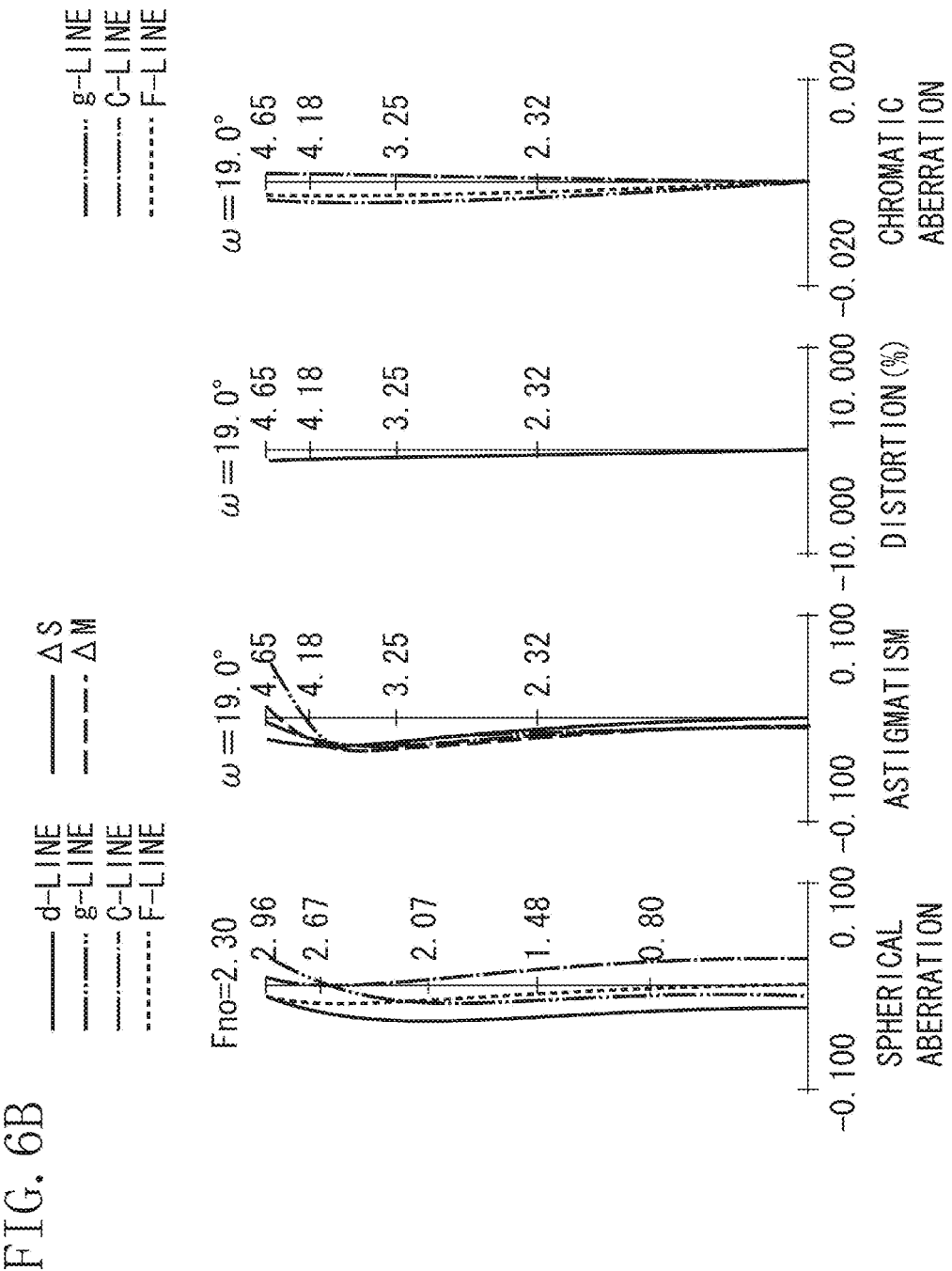
Figure 6C:
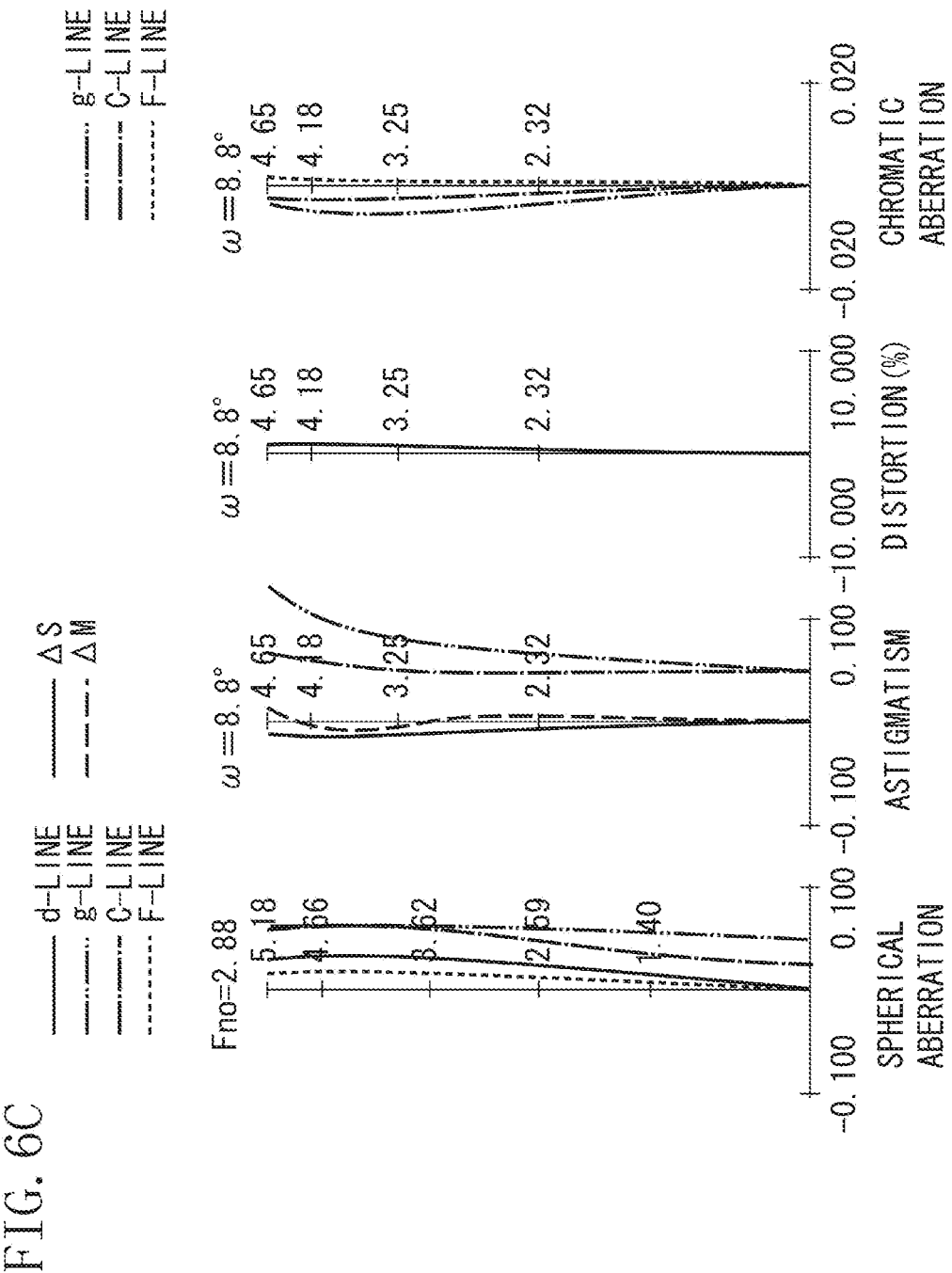

FIG. 1 is a lens cross-sectional view at a wide-angle end (short focal length end) of a zoom lens according to a first exemplary embodiment of the present invention. FIGS. 2A, 2B, and 2C are aberration diagrams at the wide-angle end, at a middle zoom position, and at a telephoto end (long focal length end), respectively, of the first exemplary embodiment of the present invention. FIG. 3 is a lens cross-sectional view at a wide-angle end of a zoom lens according to a second exemplary embodiment of the present invention. FIGS. 4A, 4B, and 4C are aberration diagrams at the wide-angle end, at a middle zoom position, and at a telephoto end, respectively, of the second exemplary embodiment of the present invention. FIG. 5 is a lens cross-sectional view at a wide-angle end of a zoom lens according to a third exemplary embodiment of the present invention. FIGS. 6A, 6B, and 6C are aberration diagrams at the wide-angle end, at a middle zoom position, and at a telephoto end, respectively, of the third exemplary embodiment of the present invention.

Figure 7:
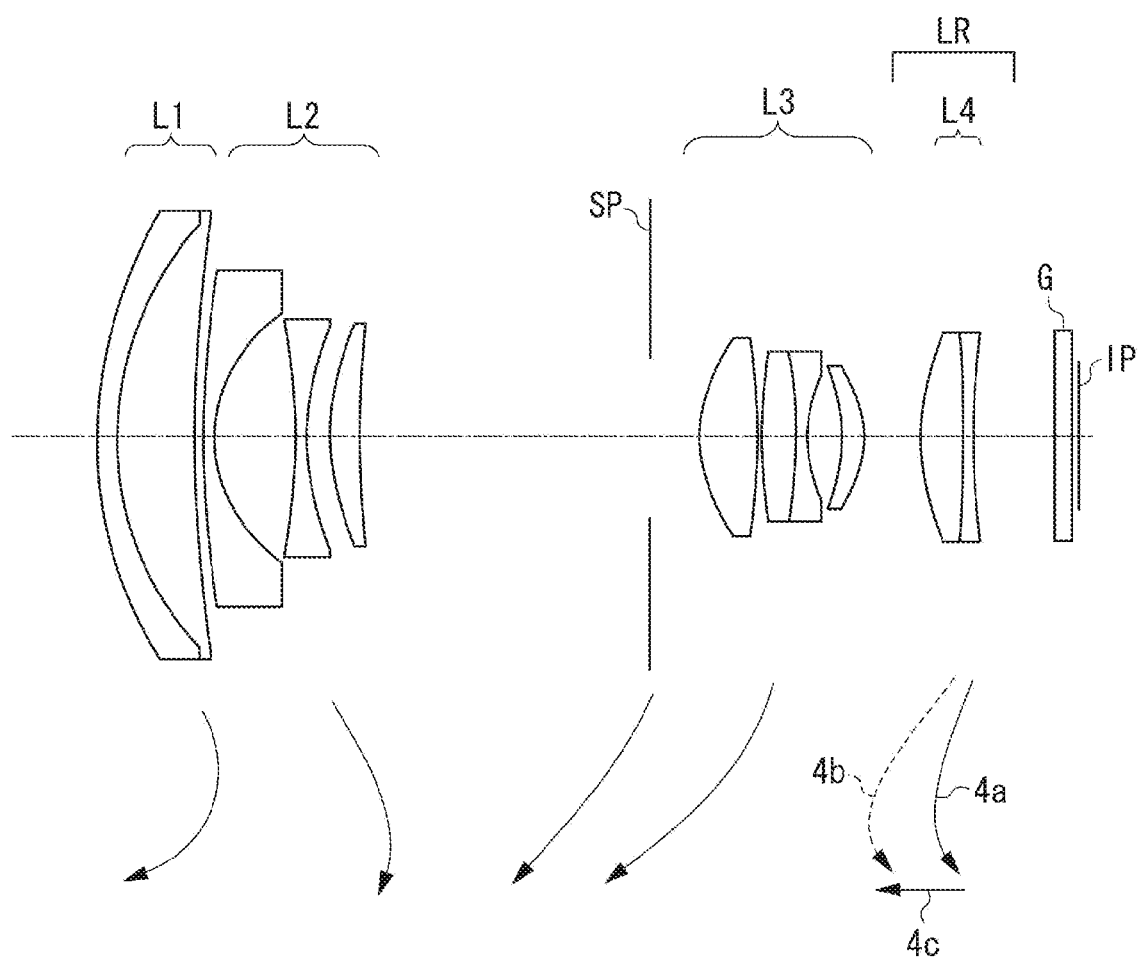
FIG. 7 is a lens cross-sectional view at a wide-angle end of a fourth exemplary embodiment of the present invention.
Figure 8A:
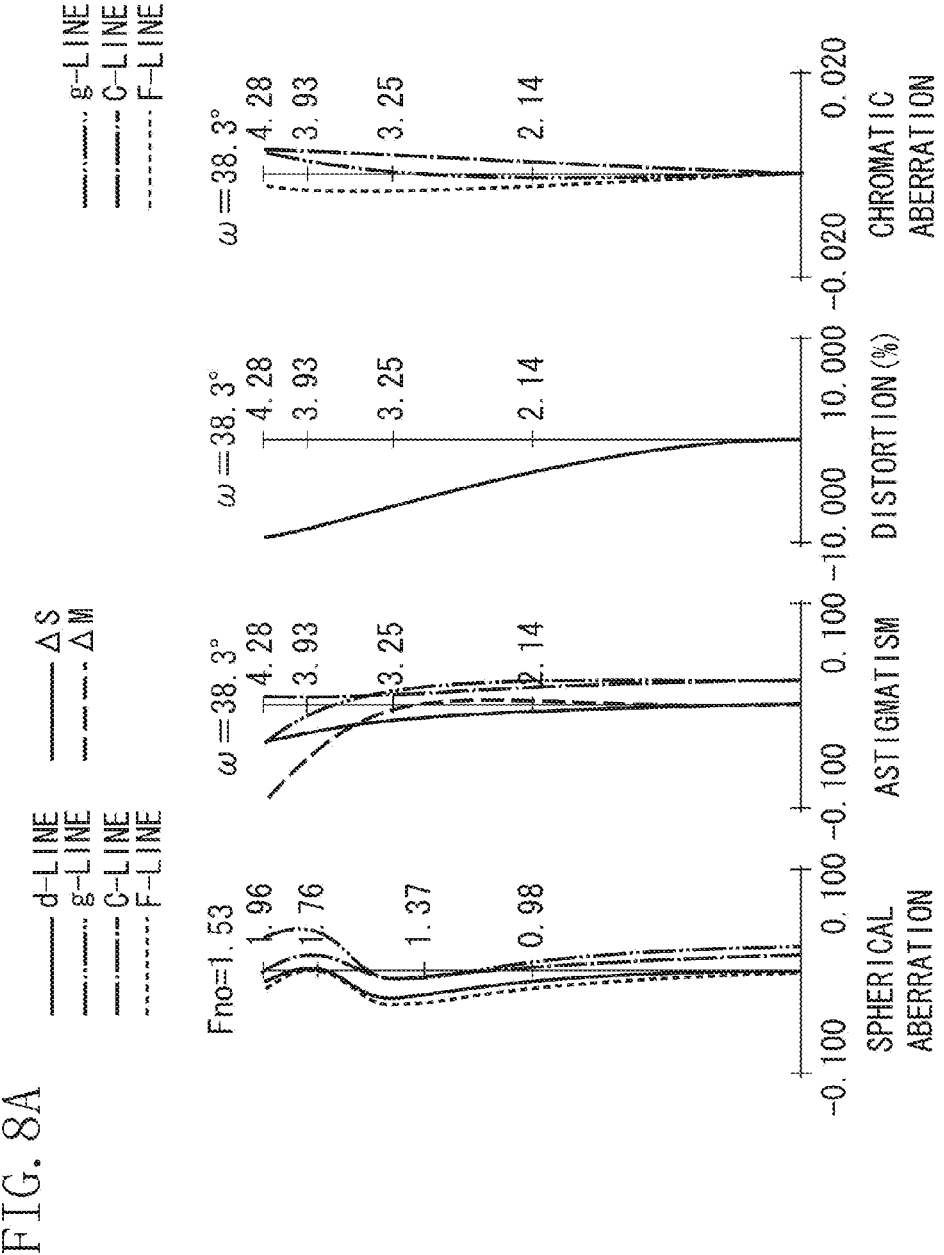
FIGS. 8A, 8B, and 8C are aberration diagrams at the wide-angle end, at a middle zoom position, and at a telephoto end, respectively, of the fourth exemplary embodiment of the present invention.
Figure 8B:
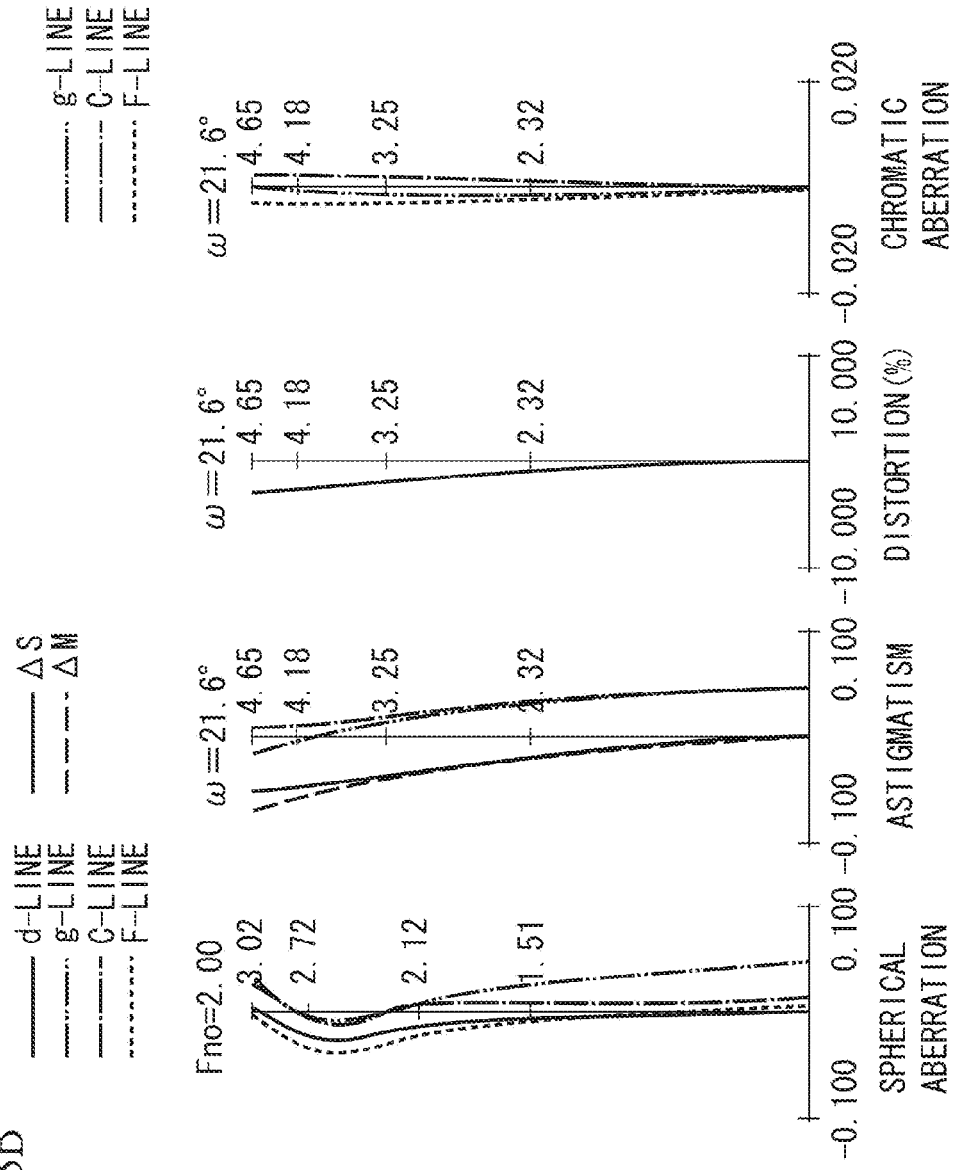
Figure 8C:
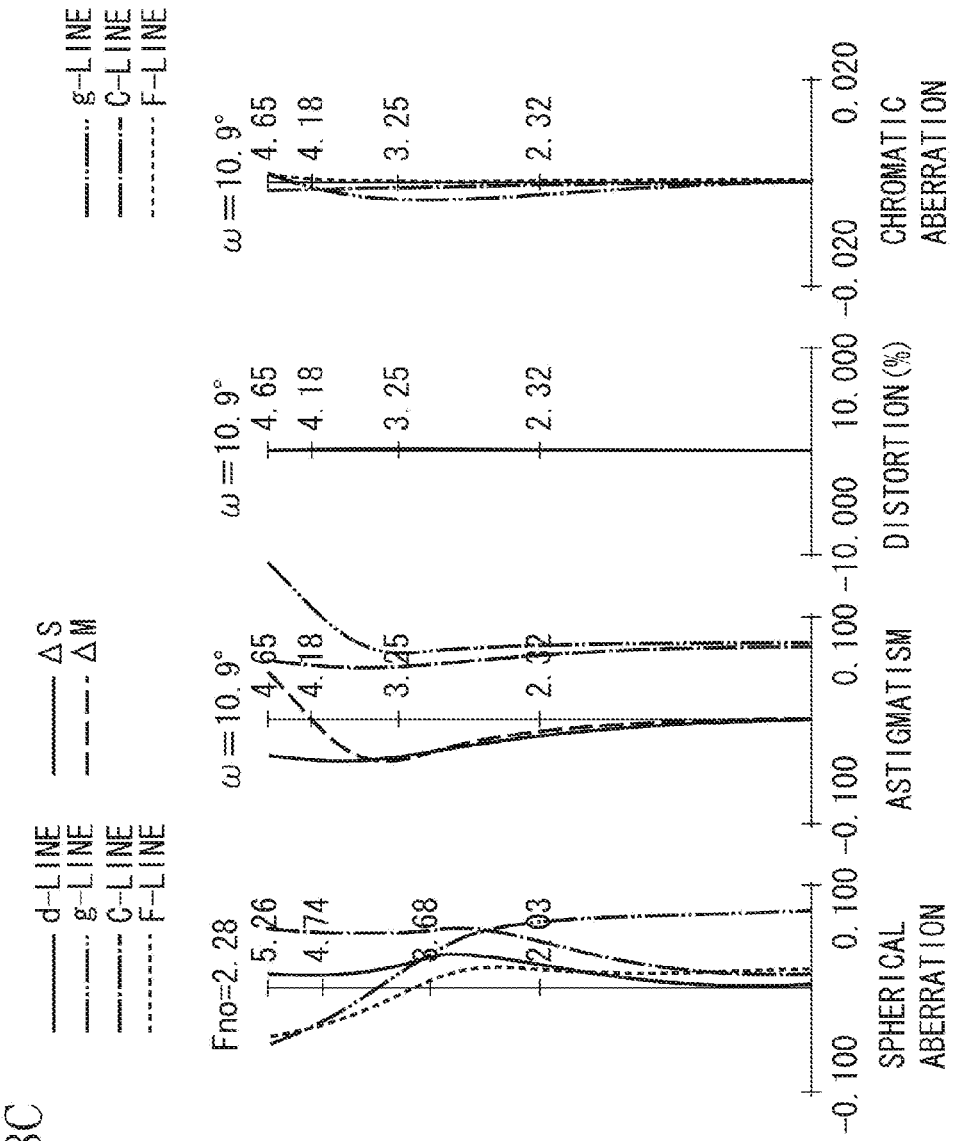
Figure 9:
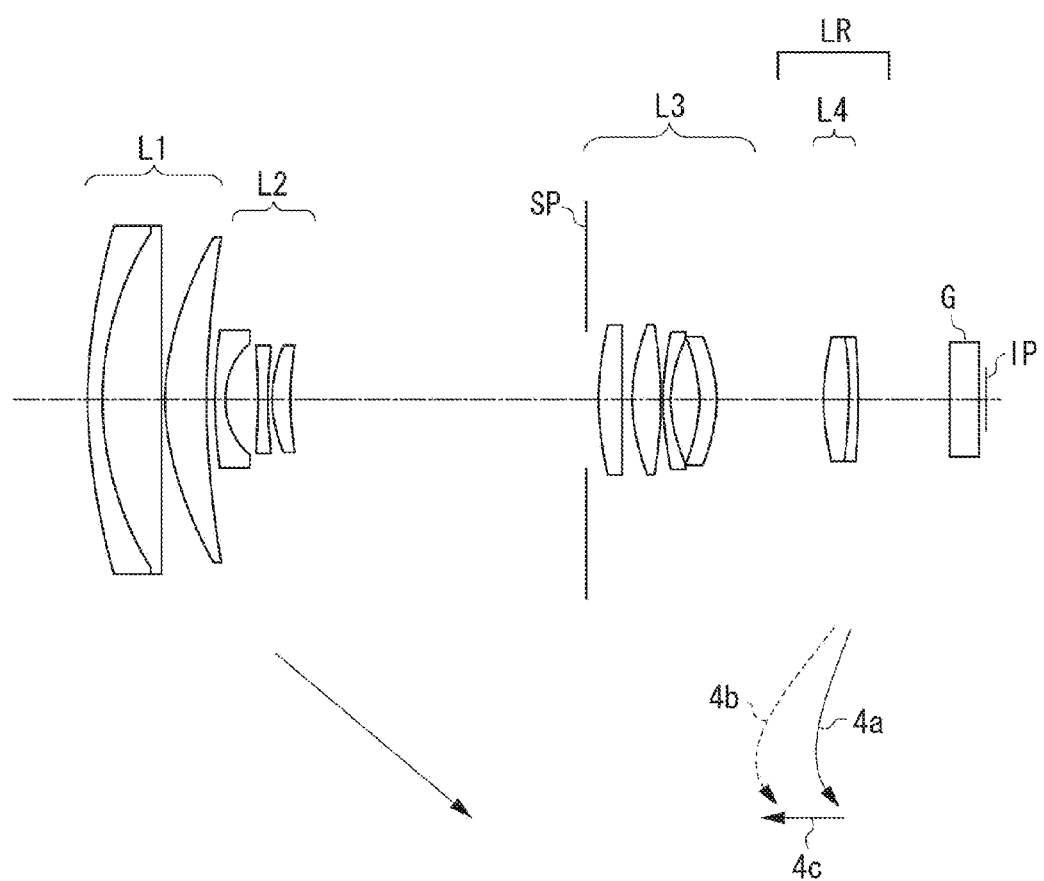
FIG. 9 is a lens cross-sectional view at a wide-angle end of a fifth exemplary embodiment of the present invention.
Figure 10A:
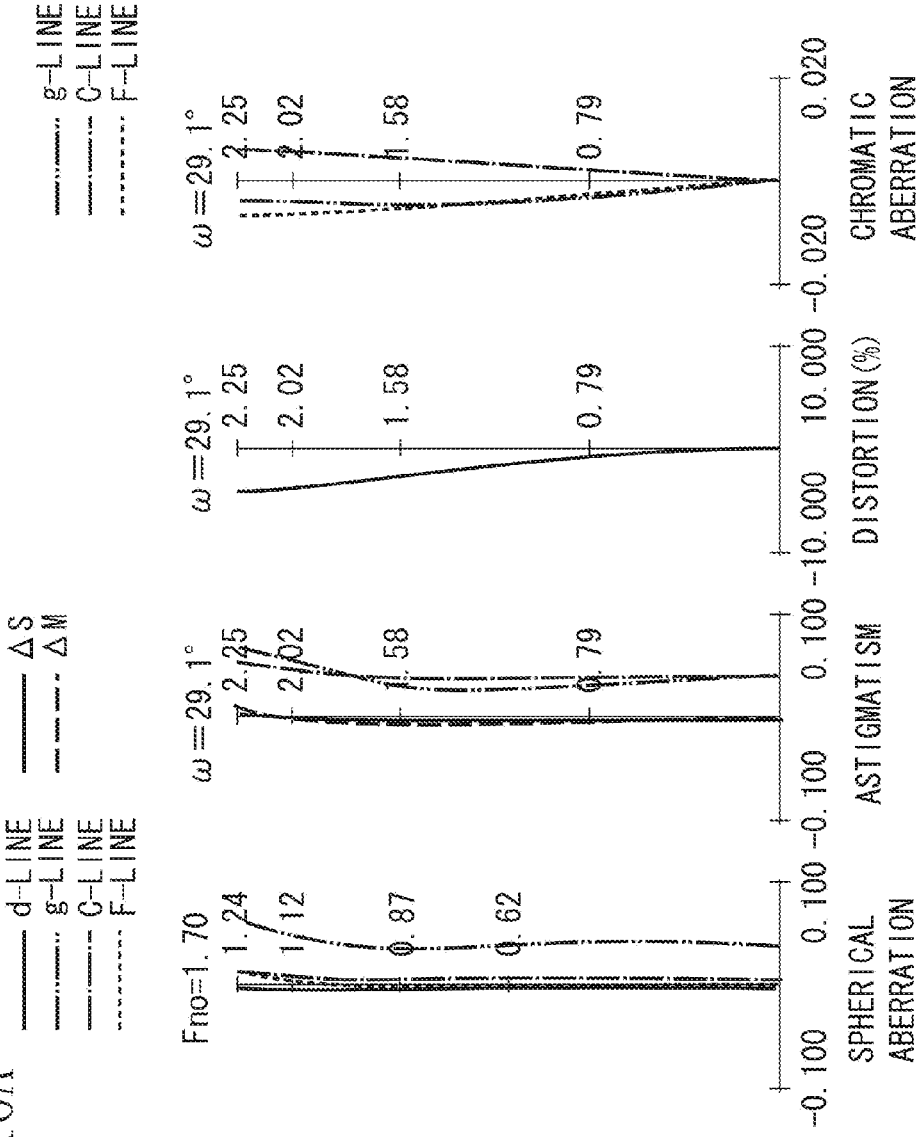
FIGS. 10A, 10B, and 10C are aberration diagrams at the wide-angle end, at a middle zoom position, and at a telephoto end, respectively, of the fifth exemplary embodiment of the present invention.
Figure 10B:
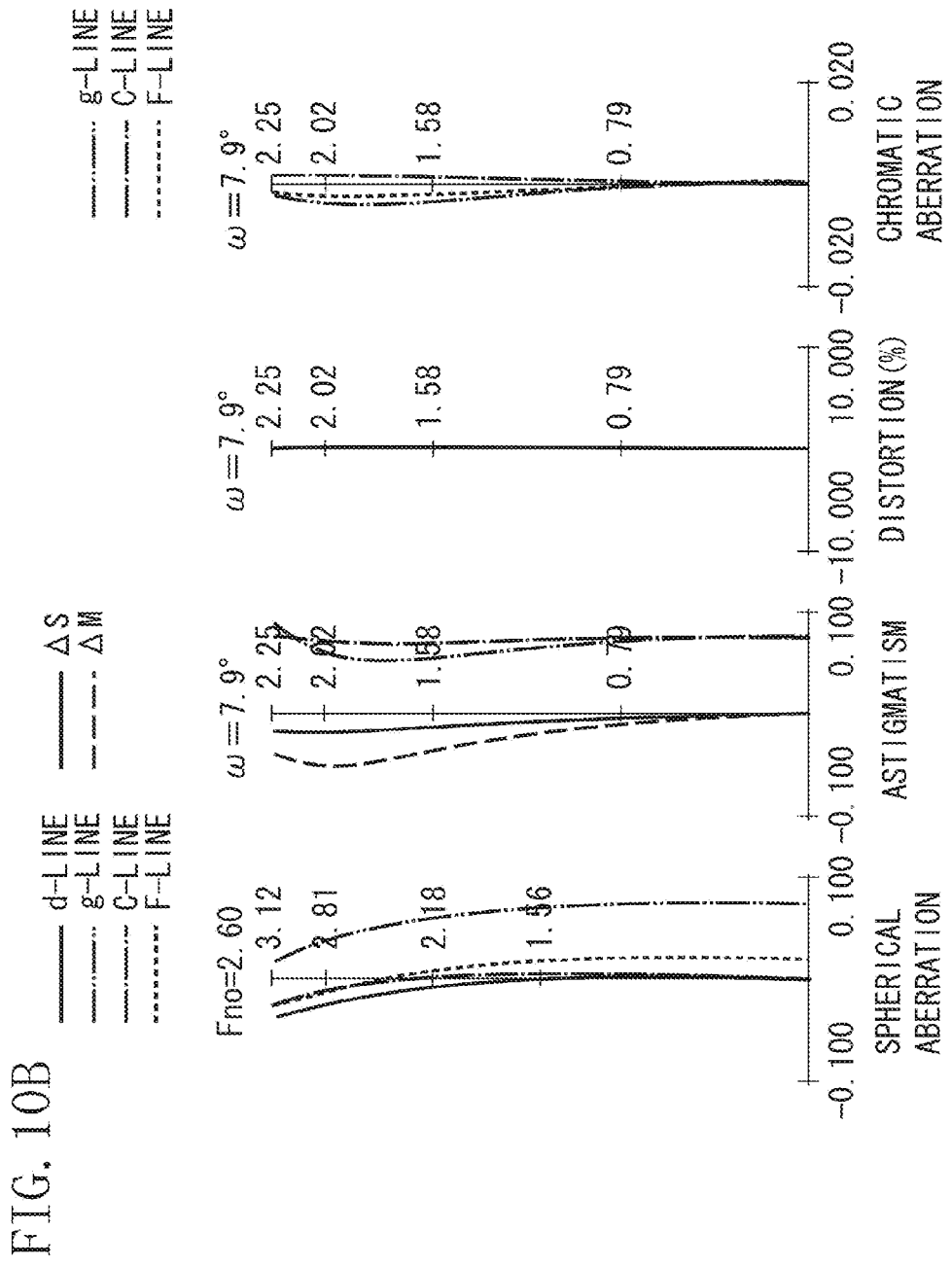
Figure 10C:
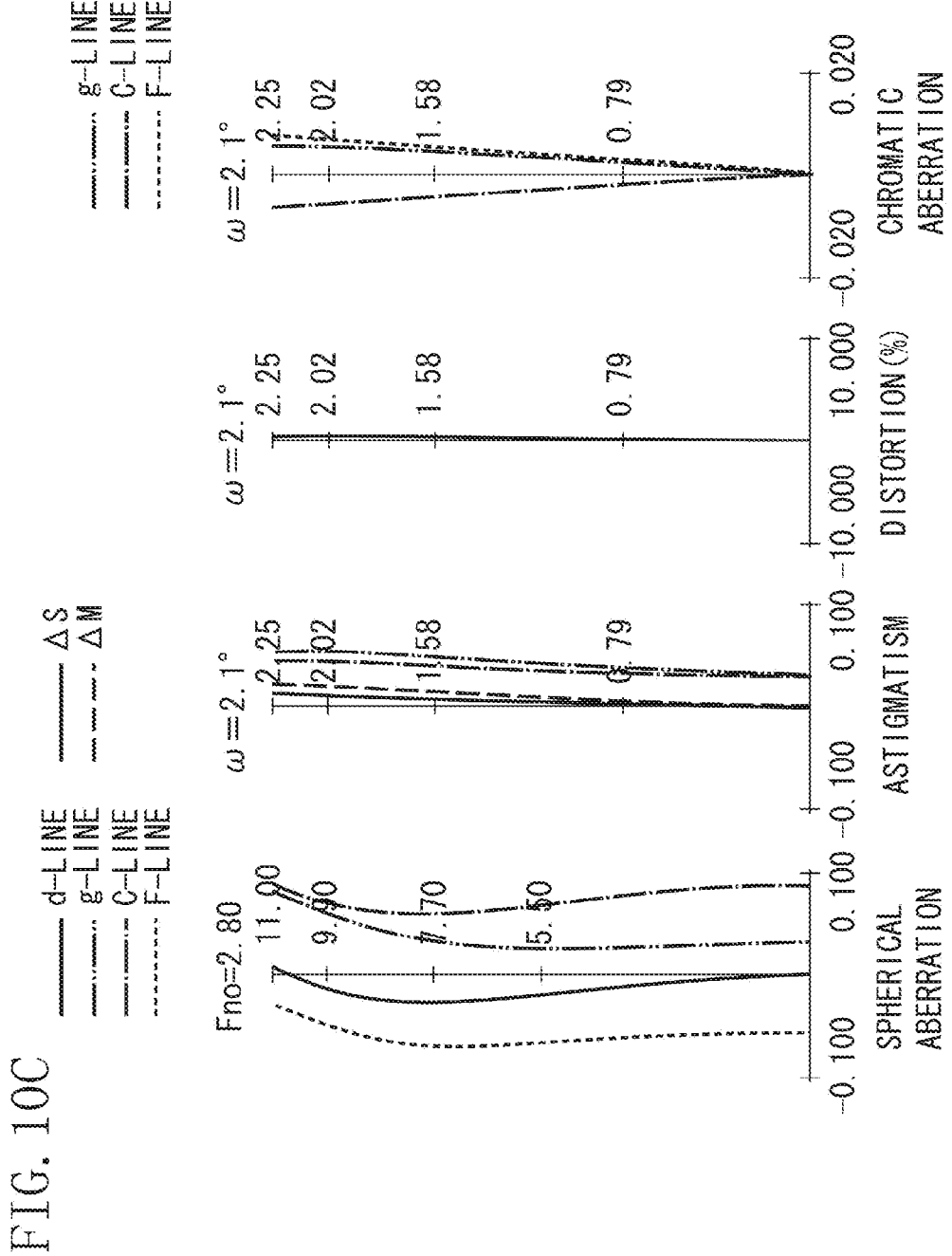
Figure 11:
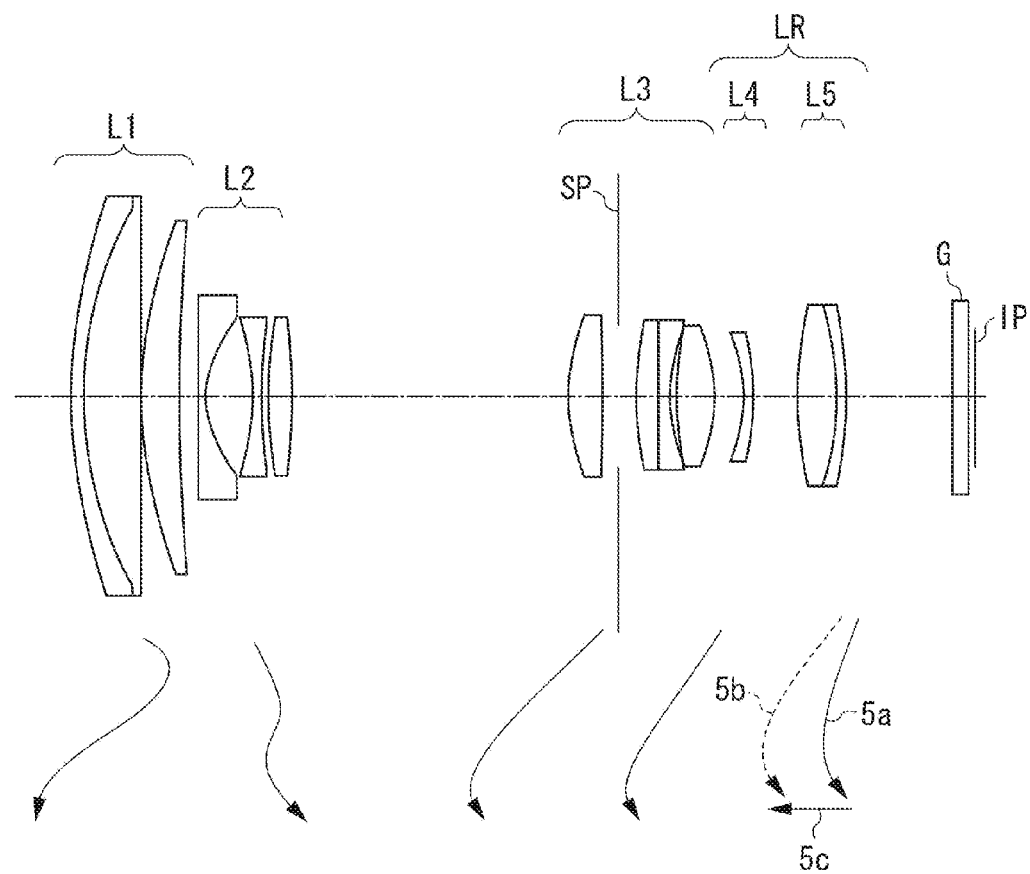
FIG. 11 is a lens cross-sectional view at a wide-angle end of a sixth exemplary embodiment of the present invention.
Figure 12A:
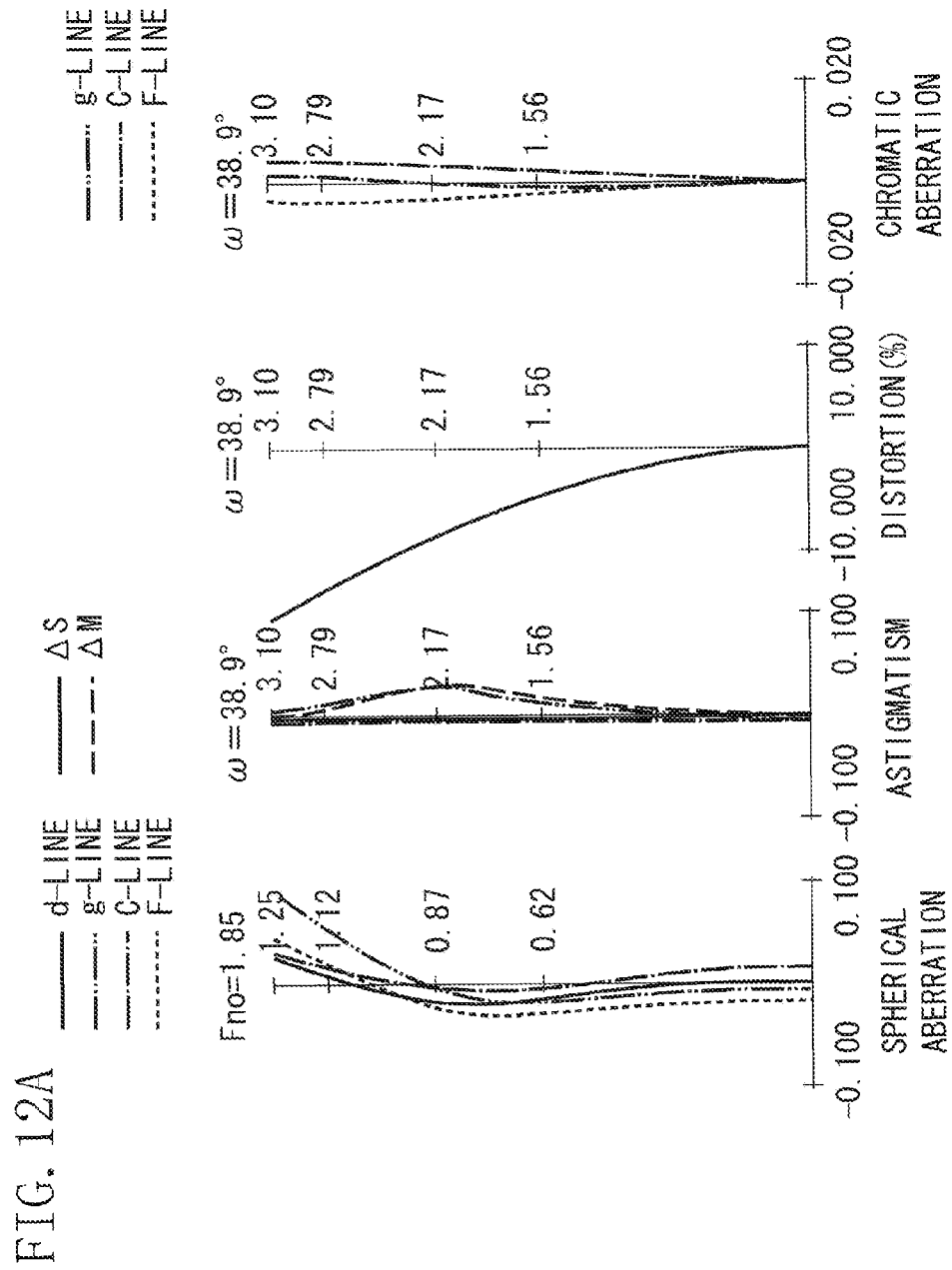
Figure 12C:
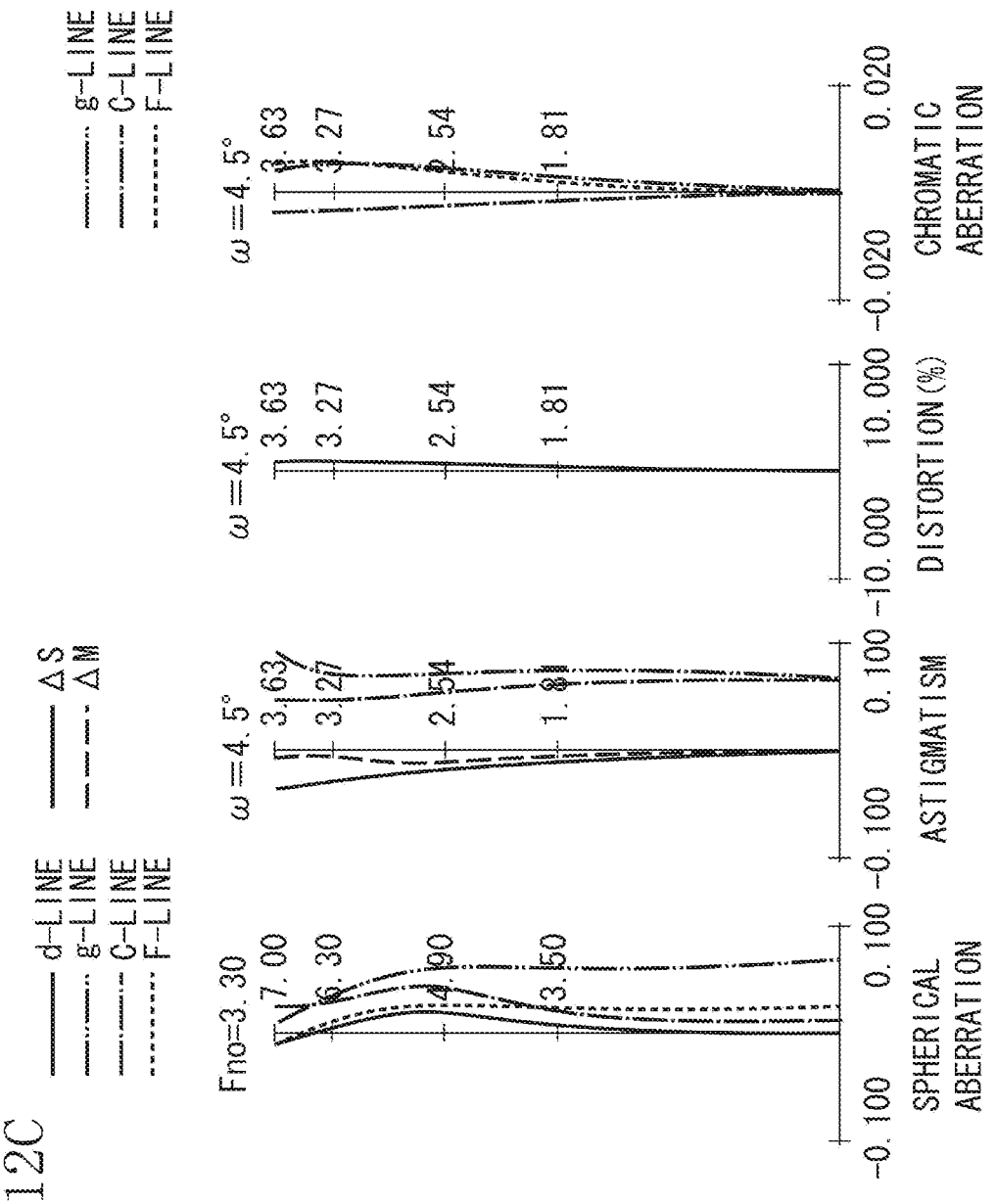

FIG. 7 is a lens cross-sectional view at a wide-angle end of a zoom lens according to a fourth exemplary embodiment of the present invention. FIGS. 8A, 8B, and 8C are aberration diagrams at the wide-angle end, at a middle zoom position, and at a telephoto end, respectively, of the fourth exemplary embodiment of the present invention. FIG. 9 is a lens cross-sectional view at a wide-angle end of a zoom lens according to a fifth exemplary embodiment of the present invention. FIGS. 10A, 10B, and 10C are aberration diagrams at the wide-angle end, at a middle zoom position, and at a telephoto end, respectively, of the fifth exemplary embodiment of the present invention. FIG. 11 is a lens cross-sectional view at a wide-angle end of a zoom lens according to a sixth exemplary embodiment of the present invention. FIGS. 12A, 12B, and 12C are aberration diagrams at the wide-angle end, at a middle zoom position, and at a telephoto end, respectively, of the sixth exemplary embodiment of the present invention.

Figure 13:
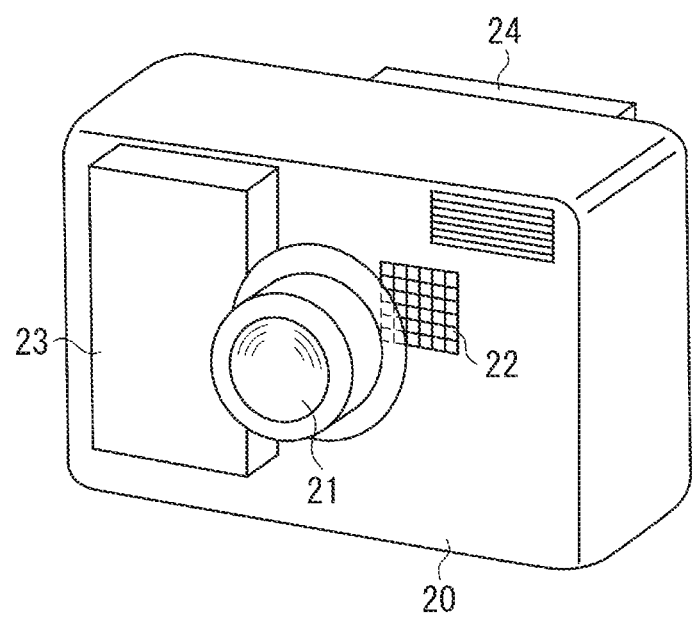
FIG. 13 is a schematic view of main components of a digital camera to which the zoom lens according to an exemplary embodiment of the present invention is applied.

FIG. 13 is a schematic view of main components of a camera (image pickup apparatus) having the zoom lens according to the exemplary embodiment of the present invention. The zoom lens of each exemplary embodiment is a photographic lens system used for an image pickup apparatus such as a video camera and a digital camera. In the lens cross-sectional views, the left side is the object side (front) and the right side is the image side (rear). In the lens cross-sectional views, i represents the number of a lens unit counted from the object side, and Li denotes the i-th lens unit. A rear lens group LR includes one or more lens units.

An aperture stop SP is also illustrated. An optical block G is equivalent to, for example, an optical filter, a face plate, a crystal low-pass filter, and an infrared cut filter. At an image plane IP, an imaging surface of a solid-state image sensor (photoelectric conversion element), such as a charge-coupled device (CCD) sensor and a complementary metal-oxide semiconductor (CMOS) sensor, or a photosensitive surface of a silver halide film or the like is arranged.

In the aberration diagrams, spherical aberration is illustrated regarding the d-line, g-line, C-line, and F-line. In the astigmatism diagrams, a dotted-line ΔM represents a meridional image plane at the d-line, and a solid-line ΔS represents a sagittal image plane at the d-line. An alternate long and two short dashes line represents a meridional image plane at the g-line, and an alternate long and short dash line represents a sagittal image plane at the g-line. The g-line, the C-line, and the F-line express lateral chromatic aberration. ω represents a half angle of view and Fno represents an F-number. In each of the following exemplary embodiments, a wide-angle end and a telephoto end are zoom positions assumed when a zooming lens unit reaches the respective ends of a range in which the lens unit can mechanically move on an optical axis.

The zoom lens of each exemplary embodiment includes, in order from an object side to an image side, a first lens unit L1 having positive refractive power, a second lens unit L2 having negative refractive power, a third lens unit L3 having positive refractive power, and a rear lens group LR including one or more subsequent lens units and having overall positive refractive power. With the rear lens group LR having positive refractive power, an off-axis ray passing through the rear lens group LR is refracted in the direction of an optical axis, thereby improving telecentricity. In addition, the back focus is shortened to reduce the total lens length.

In the first to fifth exemplary embodiments, the rear lens group LR includes one lens unit, i.e., a fourth lens unit L4 having positive refractive power. In the sixth exemplary embodiment, the rear lens group LR includes two lens units, i.e., a fourth lens unit L4 having negative refractive power and a fifth lens unit L5 having positive refractive power.

In each exemplary embodiment, zooming from a wide-angle end to a telephoto end is performed by moving the respective lens units like arrows illustrated in the lens cross-sectional views. At this time, at the telephoto end, compared with the wide-angle end, a distance between the first lens unit L1 and the second lens unit L2 becomes larger, a distance between the second lens unit L2 and the third lens unit L3 becomes smaller, and a distance between the third lens unit L3 and the rear lens group LR changes.

In the first to fourth exemplary embodiments, the first lens unit L1 moves toward the image side and then toward the object side during zooming from a wide-angle end to a telephoto end. That is, the first lens unit L1 moves with a locus convex toward the image side (along a curve convex toward the image side). The second lens unit L2 moves toward the image side and then toward the object side. That is, the second lens unit L2 moves with a locus convex toward the image side.

During zooming from the wide-angle end to the telephoto end, the third lens unit L3 moves toward the object side. The fourth lens unit L4 moves with a locus convex toward the object side (along a curve convex toward the object side) to correct a change in image plane position caused by zooming.

In the fifth exemplary embodiment, during zooming from a wide-angle end to a telephoto end, the second lens unit L2 moves toward the image side, and the fourth lens unit L4 moves with a locus convex toward the object side to correct a change in image plane position caused by zooming. During zooming, the first lens unit L1 and the third lens unit L3 do not move.

In the sixth exemplary embodiment, during zooming from a wide-angle end to a telephoto end, the first lens unit L1 once moves with a locus convex toward the image side and then moves with a locus convex toward the object side. The second lens unit L2 once moves with a locus convex toward the image side and then moves with a locus convex toward the object side. The third lens unit L3 and the fourth lens unit L4 move toward the object side during zooming from the wide-angle end to the telephoto end. The fifth lens unit L5 moves with a locus convex toward the object side to correct a change in image plane position caused by zooming.

In the first to fifth exemplary embodiments, a rear focus system is employed in which the fourth lens unit L4 corrects a change in image plane caused by zooming and performs focusing while moving on an optical axis (in the direction of the optical axis). A curve 4a of a solid-line and a curve 4b of a dotted-line about the fourth lens unit L4 in the lens cross-sectional view illustrate moving loci for correcting a change in image plane caused by zooming from a wide-angle end to a telephoto end when performing focusing on an infinite-distance object and a near-distance object, respectively. In performing focusing from an infinite-distance object to a near-distance object at a telephoto end, as illustrated with an arrow 4c of the lens cross-sectional view, the fourth lens unit L4 is moved forward (toward the object side).

Effective use of a space between the third lens unit L3 and the fourth lens unit L4 is achieved and the total lens length is shortened because the fourth lens unit L4 moves with a locus convex toward the object side during zooming.

In the sixth exemplary embodiment, the fifth lens unit L5 corrects a change in image plane caused by zooming and performs focusing. A curve 5a of a solid-line and a curve 5b of a dotted-line about the fifth lens unit L5 in the lens cross-sectional view illustrate moving loci for correcting a change in image plane caused by zooming from a wide-angle end to a telephoto end when performing focusing on an infinite-distance object and a near-distance object, respectively. In performing focusing from an infinite-distance object to a near-distance object at a telephoto end, as illustrated with an arrow 5c of the lens cross-sectional view, the fifth lens unit L5 is moved forward.

Effective use of a space between the fourth lens unit L4 and the fifth lens unit L5 is achieved and the total lens length is shortened because the fifth lens unit L5 moves with a locus convex toward the object side during zooming. In the sixth exemplary embodiment, the fourth lens unit L4 may perform focusing.

In the first and third to fifth exemplary embodiments, the aperture stop SP is arranged on the object side of the third lens unit L3. In the second and sixth exemplary embodiments, the aperture stop SP is arranged in the third lens unit L3. The aperture stop SP moves integrally with the third lens unit L3 in the first, second, and sixth exemplary embodiments during zooming, and does not move in the fifth exemplary embodiment. In the third and fourth exemplary embodiments, the aperture stop SP moves with a different locus from the other lens units. In any of the exemplary embodiments, the aperture stop SP is arranged between a lens surface of the second lens unit L2 closest to the image side and a lens surface of the third lens unit L3 closest to the image side.

In this manner, the lens system is made compact by reducing an incident height of an off-axis ray which passes through a front lens diameter at zoom positions from the wide-angle end to the middle zoom position.

In the third and fourth exemplary embodiments, the aperture stop SP and the third lens unit L3 move with different zoom loci (independently) such that a distance between the aperture stop SP and the third lens unit L3 widens and then narrows at zoom positions from the wide-angle end to the middle zoom position, and becomes the narrowest at the telephoto end. In this manner, a light flux, which serves as a flare component of a middle image height at the middle zoom position, is cut, and good optical performance is realized in the entire zoom range.

The third lens unit L3 includes, in order from the object side to the image side, a positive lens G31 having an aspheric surface and a positive lens G32 having an aspheric surface. When a refractive index at the d-line of the material of the positive lens G31 is nd31, and an Abbe number and relative partial dispersion of the material of the positive lens G32 are vd32 and θgF32, respectively, conditions below are satisfied:

$$nd31 > 1.63 \quad (1)$$

$$vd32 > 63.0 \quad (2)$$

$$\theta gF32 + 0.005 \cdot vd32 > 0.5675 \quad (3)$$

When the refractive indexes of the material at the g-line (wavelength of 435.8 nm), the F-line (486.1 nm), the C-line (656.3 nm), and the d-line (587.6 nm) are set to Ng, NF, NC, and Nd, respectively, the Abbe-number vd and the relative partial dispersion θgF are quantities expressed by:

$$vd = (Nd-1)/(NF-NC)$$

$$\theta gF = (Ng-NF)/(NF-NC).$$

Next, the technical meanings of the above conditions will be described. The condition (1) defines the material of the positive lens G31 of the third lens unit L3 arranged closest to the object side. The conditions (2) and (3) define the material of the aspheric lens G32 having positive refractive power.

The height (light height) from the optical axis becomes high when an axial light flux which has passed through the second lens unit L2 having negative refractive power and has become divergent light enters the positive lens G31 and the positive lens G32. Since the light height becomes higher as the Fno (F-number) of the lens system is made brighter, spherical aberration occurs significantly from the positive lens G31 and the positive lens G32. Therefore, spherical aberration is corrected by employing an aspheric surface for each of the positive lens G31 and the positive lens G32.

To reduce spherical aberration occurring on a lens surface, it is effective to increase a refractive index of the material of the lens and to weaken curvature of the lens surface. However, in a usual optical material, higher dispersion occurs as a refractive index becomes larger. Therefore, spherical aberration is excessively corrected relative to light having a short wavelength, and a difference (chromatic spherical aberration) in spherical aberration depending on wavelength becomes large.

Therefore, chromatic spherical aberration, which cannot be sufficiently corrected by the positive lens G31, is corrected by using, for the positive lens G32, an aspheric surface and a material with low dispersion and anomalous dispersion properties.

If the refractive index of the material of the positive lens G31 is lower than the limit of condition (1), the radius of curvature of the lens surface becomes small and occurrence of spherical aberration becomes too significant. Therefore, it becomes difficult to correct spherical aberration on the aspheric surface of the positive lens G31 and on the aspheric surface of the positive lens G32, and it becomes difficult to obtain a lens system with a bright Fno. Accordingly, a situation where condition (1) extends below the limit thereof is not desirable.

If the Abbe number of the positive lens G32 becomes too small with the lower limit of the condition (2) exceeded, namely, dispersion becomes too significant. This is undesirable because it becomes difficult to correct chromatic spherical aberration occurring significantly from the positive lens G31.

If the relative partial dispersion θgF32, which defines the anomalous dispersion properties of the material of the positive lens G32, becomes too small with the lower limit of the condition (3) exceeded, an effect of returning spherical aberration, which has been excessively corrected by the positive lens G31 relative to light having a short wavelength, with the positive lens G32 becomes small. Thus, correction of chromatic spherical aberration becomes insufficient. Accordingly, it would be disadvantageous if condition (3) reaches below its stipulated limit.

With the above configuration in each exemplary embodiment, a zoom lens having high optical performance is obtained with the entire zoom lens being compact, and with a high zoom ratio and a large aperture ratio of a bright Fno over the entire zoom range. However, the numerical ranges of the conditions (1) to (3) can allow some variation, as long as the values thereof do not go below the indicated limits. For example, conditions (1) to (3) may be set as follows:

$$nd31>1.66 \tag{1a}$$

$$vd32>65.0 \tag{2a}$$

$$\theta gF32+0.005 \cdot vd32>0.570 \tag{3a}$$

According to this, a corrective effect of spherical aberration including a difference depending on wavelength increases, and a zoom lens with a high zoom ratio and a bright Fno can still be obtained.

The effects indicated by the above conditions can be obtained to the maximum (with higher precision) if the numerical ranges of the conditions (1a) to (3a) are set as follows:

$$nd31>1.68 \tag{1b}$$

$$vd32>67.0 \tag{2b}$$

$$\theta gF32+0.005 \cdot vd32>0.573 \tag{3b}$$

There are no restrictions in particular in upper limits of the conditions (1) and (2) for obtaining an effect of the present invention. However, if the upper limit is set in terms of restrictions of a material that is easily obtained in general, the availability of the material is further enhanced when the conditions below are satisfied:

$$nd31<2.1 \tag{1c}$$

$$vd32<100 \tag{2c}$$

and further, $$nd31<1.95 \tag{1d}$$

$$vd32<97 \tag{2d}$$

With the configuration mentioned above, various aberrations can be appropriately corrected, and a zoom lens with a high zoom ratio and high optical performance over the entire zoom range can be obtained.

In each exemplary embodiment, one or more of the following conditions can be satisfied. Focal lengths of the entire zoom lens at the wide-angle end and at the telephoto end are set to fw and ft, respectively. Focal lengths of the first lens unit L1, the second lens unit L2, and the third lens unit L3 are set to f1, f2, and f3, respectively. A focal length of the rear lens group LR at the telephoto end is set to fR.

In the third lens unit, in order from the object side to the image plane, focal lengths of the two positive lenses G31 and G32 each having an aspheric surface are set to f31 and f32, respectively. A lens surface of the positive lens G31 on the object side is an aspheric surface with a convex shape near the optical axis and with weaker positive refractive power at a position further away from the optical axis. A lens surface of the positive lens G32 on the object side is an aspheric surface with a convex shape.

The maximum height at which an axial ray or an off-axis ray passes through the lens surfaces of the positive lens G31 and the positive lens G32 on the object side during zooming from the wide-angle end to the telephoto end is set as a reference. At this time, differences of a sag of a paraxial radius of curvature of the lens surfaces of the positive lens G31 and the positive lens G32 on the object side from a sag of the aspheric shapes are set to Sag1a and Sag2a, respectively. A lens surface of the positive lens G31 on the image side has a convex shape.

The maximum height at which an axial ray or an off-axis ray passes through the lens surface of the positive lens G31 on the image side during zooming from the wide-angle end to the telephoto end is set as a reference. At this time, a difference of a sag of a paraxial radius of curvature of the lens surface of the positive lens G31 on the image side from a sag of aspheric shape is set to Sag1b. In this case, the sag is defined as a distance from a normal drawn from the lens surface vertex to the optical axis, and an amount measured from this normal in a traveling direction of light is positive in terms of sign. When a sag from a paraxial radius of curvature is Δ (spherical) and a sag of the aspheric shape is Δ (aspheric), a difference in sag "Sag" is obtained as follows:

$$Sag=\Delta(spherical)-\Delta(aspheric)$$

When the lens surface of the positive lens G31 on the image side has a spherical shape, the difference Sag1b satisfies:

$$Sag1b=0.$$

A refractive index at the d-line of the material of the positive lens G32 is set to nd32.

It is assumed that the zoom lens of each exemplary embodiment is used for an image pickup apparatus using a solid-state image sensor. At this time, an F-number of the entire zoom lens at the wide-angle end is set to Fnow. Lateral magnifications of the second lens unit L2 at the wide-angle end and at the telephoto end are set to β2w and β2t, respectively. The maximum height at which an axial ray or an off-axis ray passes through an object-side surface of the lens G31 is set to hgt31a and the maximum light height at the image plane is set to Ymax during zooming from the wide-angle end to the telephoto end. At this time, one or more of the following conditions can be satisfied:

$$0.1 < fR/ft < 1.5 \quad (4)$$

$$1.2 < f3/fw < 5.0 \quad (5)$$

$$-1.3 < (f2 \cdot f3)/(fw \cdot ft) < -0.1 \quad (6)$$

$$0.0008 < Sag1a/f31 < 0.0200 \quad (7)$$

$$0.0001 < |Sag2a|/f32 < 0.0120 \quad (8)$$

$$0.03 < |f2|/ft < 0.60 \quad (9)$$

$$0.2 < f1/ft < 2.6 \quad (10)$$

$$0.05 < Fnow/(ft/fw) < 0.50$$

$$1.5 < \beta2t/\beta2w < 25.0 \quad (12)$$

$$0.04 < (f1 \cdot fR)/ft^2 < 2.60 \quad (13)$$

$$0.2 < |Sag1a - Sag1b| \cdot (nd31-1)/(|Sag2a| \cdot (nd32-1)) < 15.0 \quad (14)$$

$$0.3 < hgt31a/(Ymax \cdot Fnow) < 1.0 \quad (15)$$

Next, the technical meanings of the above conditions will be described. The condition (4) defines the focal length of the rear lens group LR at the telephoto end. At the telephoto end, a light height of an off-axis light flux which passes through the rear lens group LR becomes high.

If the focal length of the rear lens group LR becomes too small with the lower limit of the condition (4) exceeded, namely, positive refractive power becomes too large, the light height when an off-axis light flux enters the rear lens group LR becomes high. Therefore, an effect of refracting an off-axis light flux in the direction of an optical axis at the telephoto end becomes too strong. As a result, at the telephoto end, the position of an exit pupil becomes too close to the image plane, a difference in exit pupil position between the telephoto end and the wide-angle end becomes large, and telecentricity is deteriorated.

For this reason, image formation efficiency with a solid-state image sensor is reduced at a peripheral portion of the screen. If positive refractive power of the rear lens group LR becomes too small with the upper limit exceeded, a back focus becomes long, making it difficult to reduce the total lens length.

The condition (5) defines refractive power of the third lens unit L3. If the refractive power of the third lens unit L3 becomes too large with the lower limit of the condition (5) exceeded, it becomes advantageous for the reduction in total lens length and an increase in zoom ratio. However, curvature of a lens surface of a positive lens constituting the third lens unit L3 becomes too high and an amount of occurrence of spherical aberration becomes large, making it difficult to achieve a large aperture ratio. If the refractive power of the third lens unit L3 becomes too small with the upper limit exceeded, a zoom stroke of the third lens unit L3 for zooming becomes too large, and the total lens length increases.

The condition (6) defines refractive power of the second lens unit L2 and the third lens unit L3 relative to focal lengths of the entire zoom lens at the wide-angle end and at the telephoto end. If an absolute value of refractive power of the second lens unit L2 and the third lens unit L3 becomes too large with the lower limit of the condition (6) exceeded, it becomes advantageous for the reduction in total lens length. However, at the wide-angle end, lateral chromatic aberration, curvature of field, and astigmatism occur in a large amount from the second lens unit L2, and spherical aberration occurs in a large amount from the third lens unit L3. Therefore, it becomes difficult to achieve a large aperture ratio.

Conversely, if an absolute value of refractive power of the second lens unit L2 and the third lens unit L3 becomes too small with the upper limit exceeded, zoom strokes of the second lens unit L2 and the third lens unit L3 for zooming become too large, and the total lens length increases.

The condition (7) defines an aspheric sag and refractive power of a convex surface on the object side in the positive lens G31 having an aspheric surface. A sign of Sag1a being positive means that, in a maximum diameter of light passage, aspheric surface curvature of a convex shape is smaller than paraxial curvature, namely, positive refractive power is small. Since an axial ray passes through a high position in the entire zoom range in the positive lens G31, a corrective effect of spherical aberration by an aspheric surface is high.

If a difference in aspheric sag of a lens surface of the positive lens G31 on the object side becomes too small with the lower limit of the condition (7) exceeded, an effect of correcting spherical aberration in the under direction becomes insufficient. This spherical aberration occurs in an axial ray passing through a peripheral portion of the positive lens G31 and having a large light ratio. As a result, it becomes difficult to achieve a large aperture ratio. If refractive power of the positive lens G31 becomes too small with the lower limit of the condition (7) exceeded, refractive power of the positive lens G32 has to be relatively increased. As a result, spherical aberration occurs significantly from the positive lens G32.

Conversely, if the difference in the sag of the aspheric shape becomes too large with the upper limit of the condition (7) exceeded, spherical aberration is excessively corrected. If refractive power of the positive lens G31 becomes too large with the upper limit exceeded, spherical aberration occurring at the positive lens G31 becomes so significant that it is difficult to correct spherical aberration at this time by an aspheric surface or other lens units.

The condition (8) defines an aspheric sag and refractive power when a lens surface of the positive lens G32, having an aspheric surface, on the object side has an aspheric and convex shape. The positive lens G32 has a function of correcting chromatic spherical aberration, which cannot be sufficiently corrected in the positive lens G31, as well as a function of correcting spherical aberration occurring from the positive lens G32. For this reason, a sign of the difference Sag2a in aspheric sag may be either positive or negative depending on refractive power of the positive lens G31 and the positive lens G32, or on a combination of the materials of the lenses.

If an aspheric sag of the lens surface of the positive lens G32 on the object side becomes too small with the lower limit of the condition (8) exceeded, spherical aberration occurring from the positive lens G32 is insufficiently corrected. Residual chromatic spherical aberration occurring from the positive lens G31 is also insufficiently corrected. As a result, it becomes difficult to achieve a large aperture ratio. If refractive power of the positive lens G32 becomes too small with the lower limit exceeded, refractive power of the positive lens G31 becomes too strong and spherical aberration occurs significantly from the positive lens G31, making it difficult to correct spherical aberration at this time.

Conversely, if the aspheric sag becomes too large with the upper limit of the condition (8) exceeded, spherical aberration is excessively corrected. This excessive correction excessively increases a cancellation effect of spherical aberration between the positive lens G31 and the positive lens G32, and deteriorates resolving performance with a plurality of inflection points generated in the spherical aberration. The degree of deterioration in optical performance relative to the relative decentration between the positive lens G31 and the positive lens G32 becomes large, and the zoom lens becomes very sensitive to a manufacturing error. If refractive power of the positive lens G32 becomes too large exceeding the maximum value, spherical aberration occurs significantly from the positive lens G32, and it becomes difficult to correct the spherical aberration at this time with an aspheric surface or other lenses.

The condition (9) defines refractive power of the second lens unit L2. If the refractive power of the second lens unit L2 becomes too large with the lower limit of the condition (9) exceeded, lateral chromatic aberration, curvature of field, astigmatism and the like occur significantly from the second lens unit L2, and zoom variation of these types of aberration becomes large. It becomes difficult to correct these types of aberration with other lens units, and to achieve a large aperture ratio in the entire zoom range. Conversely, if the refractive power of the second lens unit L2 becomes too small with the upper limit exceeded, a zoom stroke of the second lens unit L2 for zooming becomes too large, thus increasing the total lens length.

The condition (10) defines refractive power of the first lens unit L1. If the refractive power of the first lens unit L1 becomes too large with the lower limit of the condition (10) exceeded, axial chromatic aberration becomes too large at the telephoto end, and it becomes difficult to obtain good optical performance at the telephoto end. If the refractive power of the first lens unit L1 becomes too small with the upper limit exceeded, the second lens unit L2 cannot have a sufficient zooming ratio, making it difficult to obtain a high zoom ratio, or a zoom stroke of the second lens unit L2 for zooming becomes large, thus increasing the total lens length.

The condition (11) defines a relation between an F-number and a zoom ratio at the wide-angle end. If an F-number relative to a zoom ratio becomes too small with the lower limit of the condition (11) exceeded, spherical aberration occurs significantly from the third lens unit L3 and it becomes difficult to maintain high optical performance over the entire zoom range. If an F-number relative to a zoom ratio becomes too large with the upper limit exceeded, it becomes difficult to achieve a high zoom ratio and a large aperture ratio.

The condition (12) defines a zooming share of the second lens unit L2. If the zooming share of the second lens unit L2 becomes too small with the lower limit of the condition (12) exceeded, it becomes difficult to achieve a high zoom ratio. If the zooming share of the second lens unit L2 becomes too large with the upper limit exceeded, various aberrations, such as lateral chromatic aberration, curvature of field, and astigmatism occur significantly from the second lens unit L2, and a zoom change of the aberrations becomes large. It becomes difficult to correct the aberrations at this time with other lens units, and to achieve a large aperture ratio in the entire zoom range.

The condition (13) defines refractive power of the first lens unit L1 and the rear lens group LR at the telephoto end. If the refractive power of the first lens unit L1 and the rear lens group LR at the telephoto end becomes too large with the lower limit of the condition (13) exceeded, a zoom change of an exit pupil position becomes too large. As a result, telecentricity is deteriorated and image formation efficiency with a solid-state image sensor is reduced at a peripheral portion of the screen. Conversely, if the refractive power of the first lens unit L1 and the rear lens group LR becomes too small with the upper limit exceeded, the total lens length increases.

The condition (14) defines aspheric sags of the positive lens G31 and the positive lens G32, i.e., a sharing ratio of the amount of correcting spherical aberration by an aspheric surface. The difference Sag1b is 0 when a lens surface of the positive lens G31 on the image side has a spherical shape. If the aspheric sag of the positive lens G31 becomes too small or the aspheric sag of the positive lens G32 becomes too large exceeding the lower limit of the condition (14), the sharing ratio of the amount of correcting spherical aberration at the positive lens G32 becomes too large.

Conversely, if the aspheric sag of the positive lens G31 becomes too large or the aspheric sag of the positive lens G32 becomes too small with the upper limit exceeded, the sharing ratio of the amount of correcting spherical aberration at the positive lens G31 becomes too large. In either case, therefore, it becomes difficult to correct spherical aberration effectively with the third lens unit L3, and to achieve a large aperture ratio.

The condition (15) defines a relation among the size of an image sensor when a zoom lens is used for an image pickup apparatus having the image sensor, an F-number at the wide-angle end, and an effective diameter of the positive lens G31. The maximum height hgt31a, at which an axial ray or an off-axis ray passes through a lens surface of the positive lens G31 on the object side, determines the effective diameter of the positive lens G31.

If the effective diameter of the positive lens G31 becomes too small with the lower limit of the condition (15) exceeded, it becomes difficult to secure a sufficient effective diameter relative to an axial light flux of a bright F-number, and to achieve a large aperture ratio. If the effective diameter of the positive lens G31 becomes too large with the upper limit exceeded, spherical aberration occurs significantly from the positive lens G31. It thus becomes difficult to correct spherical aberration at this time with aspheric surfaces of the positive lens G31 and the positive lens G32, and to obtain high optical performance while achieving a large aperture ratio. The numerical ranges of the above conditions can be set as follows:

$$0.2 < fR/ft < 1.3 \quad (4a)$$

$$1.6 < f3/fw < 4.5 \quad (5a)$$

$$-1.2 < (f2 \cdot f3)/(fw \cdot ft) < -0.2 \quad (6a)$$

$$0.001 < \text{Sag1}a/f31 < 0.016 \quad (7a)$$

$$0.0001 < |\text{Sag2}a|/f32 < 0.0100 \quad (8a)$$

$$0.05 < |f2|/ft < 0.50 \quad (9a)$$

$$0.3 < f1/ft < 2.3 \quad (10a)$$

$$0.08 < F\text{now}/(ft/fw) < 0.45 \quad (11a)$$

$$1.7 < \beta 2t/\beta 2w < 20.0 \quad (12a)$$

$$0.07 < (f1 \cdot fR)/ft^2 < 2.40 \quad (13a)$$

$$0.45 < |\text{Sag1}a - \text{Sag1}b| \cdot (nd31-1)/(|\text{Sag2}a| \cdot (nd32-1)) < 12 \quad (14a)$$

$$0.4 < \text{hgt31}a/(Y\max \cdot F\text{now}) < 0.9 \quad (15a)$$

The effects indicated by the above conditions can be obtained to the maximum if the numerical ranges of the conditions are set as follows:

$$0.25 < fR/ft < 1.2 \quad (4b)$$

$$2.0 < f3/fw < 4.0 \quad (5b)$$

$$-1.10 < (f2 \cdot f3)/(fw \cdot ft) < -0.25 \quad (6b)$$

$$0.0012 < \text{Sag1}a/f31 < 0.0130 \quad (7b)$$

$$0.0002 < |\text{Sag2}a|/f32 < 0.0090 \quad (8b)$$

$$0.07 < |f2|/ft < 0.45 \quad (9b)$$

$$0.4 < f1/ft < 2.0 \quad (10b)$$

$$0.1 < F\text{now}/(ft/fw) < 0.4 \quad (11b)$$

$$1.9 < \beta 2t/\beta 2w < 18.0 \quad (12b)$$

$$0.1 < (f1 \cdot fR)/ft^2 < 2.2 \quad (13b)$$

$$0.6 < |\text{Sag1}a - \text{Sag1}b| \cdot (nd31-1)/(|\text{Sag2}a| \cdot (nd32-1)) < 9.0 \quad (14b)$$

$$0.45 < \text{hgt31}a/(Y\text{max} \cdot F\text{now}) < 0.85 \quad (15b)$$

The positive lens G31 can have a biconvex shape. With this configuration, refractive power of the positive lens can be shared between the two lens surfaces on the object side and on the image side, and curvature of the lens surfaces can be weakened. Therefore, occurrence of spherical aberration decreases.

The third lens unit L3 can include three or more positive lenses. With this configuration, refractive power of the third lens unit L3 can be shared among the respective positive lenses and heightened while keeping curvature of the lens surfaces weak. Therefore, it becomes easy to achieve a high zoom ratio while maintaining a large aperture ratio in the entire zoom range.

According to each exemplary embodiment, by setting the respective constituent elements as mentioned above, a zoom lens having high optical performance can be obtained, with the entire zoom lens being compact. This zoom lens also has a high zoom ratio and a large aperture ratio with a bright Fno over the entire zoom range.

Features of the lens configurations according to the respective exemplary embodiments will be described below. In the first exemplary embodiment, the first lens unit L1 includes a cemented lens including a negative lens (lens having negative refractive power) of a meniscus shape with its convex surface facing the object side, and a positive lens (lens having positive refractive power) of a meniscus shape with its concave surface facing the image side. With this configuration, at the telephoto end, chromatic aberration and a change in lateral chromatic aberration caused by zooming are corrected. The materials of the negative lens and the positive lens are selected such that a refractive index thereof at the d-line is 1.8 or more. The occurrence of spherical aberration is thus suppressed by keeping curvature of the lens surfaces not so high while increasing refractive power of the first lens unit L1.

The second lens unit L2 includes three lenses, i.e., in order from the object side to the image side, a negative lens of a meniscus shape with its concave surface facing the image side, a negative lens with both lens surfaces having a concave shape, and a positive lens of a meniscus shape with its convex surface facing the object side. With this configuration, changes in various aberrations, such as lateral chromatic aberration, curvature of field, and astigmatism, caused by zooming are effectively corrected. The third lens unit L3 has the following configuration in order from the object side to the image side.

The third lens unit L3 includes four lenses, i.e., positive lenses G31 and G32, a negative lens G33, and a positive lens G34. The positive lens G31 has a convex shape on both lens surfaces thereof, with curvature stronger on the object side than on the image side. The positive lens G32 has a lens shape similar to that of the positive lens G31. The negative lens G33 has a concave shape on both lens surfaces thereof, with curvature stronger on the image side than on the object side. The positive lens G34 has a meniscus shape with its convex surface facing the image side.

Both surfaces of the positive lens G31 have an aspheric shape, and a lens surface of the positive lens G32 on the object side has an aspheric shape. With this configuration, spherical aberration is corrected effectively relative to wavelengths of the entire visible light region, and a bright F-number is realized over the entire zoom range. Chromatic aberration occurring from the third lens unit L3 is reduced by constituting a cemented lens, which includes the positive lens G32 and the negative lens G33 arranged on the image side of the positive lens G32.

Spherical aberration occurring from the third lens unit L3 is suppressed by sharing positive refractive power with the positive lens G34 arranged closest to the image plane among the third lens unit L3. A material having anomalous dispersion properties is used for the positive lens G34, thereby suppressing generation of secondary spectrum from the third lens unit L3. The fourth lens unit L4 includes a cemented lens obtained by joining a biconvex positive lens and a biconcave negative lens, and thus suppresses changes in axial chromatic aberration and lateral chromatic aberration caused by focusing. The aperture stop SP is arranged on the object side of the third lens unit L3, and moves integrally with the third lens unit L3 during zooming.

The lens configuration of the second exemplary embodiment is similar to that of the first exemplary embodiment except that, in the second exemplary embodiment, the aperture stop SP is arranged between the positive lens G31 and the positive lens G32 of the third lens unit L3. With this configuration, compared with a case where the aperture stop SP is arranged on the object side of the third lens unit L3, a distance between the second lens unit L2 and the third lens unit L3 is shortened at the telephoto end, thus reducing the total lens length at the telephoto end. By changing the maximum diameter of the aperture stop SP depending on a zoom position, a desired F-number can be obtained for each zoom position.

In the third exemplary embodiment, the lens configurations of the first lens unit L1 and the third lens unit L3 are similar to those of the first exemplary embodiment. The second lens unit L2 includes four lenses, i.e., in order from the object side to the image side, two negative lenses of a meniscus shape with their concave surfaces facing the image side, a biconcave negative lens, and a positive lens of a meniscus shape with its convex surface facing the object side.

This configuration effectively corrects changes in various aberrations, such as lateral chromatic aberration, curvature of field, and astigmatism, caused by zooming. The fourth lens unit L4 includes a positive lens of a meniscus shape with its convex surface facing the object side, and improvement in the focusing speed is facilitated by reducing the weight of the lens. Changes in curvature of field and astigmatism caused by focusing and zooming are suppressed by employing an aspheric shape for both lens surfaces.

The aperture stop SP is arranged between the second lens unit L2 and the third lens unit L3. The second lens unit L2 and the third lens unit L3 are moved with different loci, by changing the maximum diameter of the aperture stop SP during zooming. In this manner, a desired F-number can be obtained at each zoom position. The aperture stop SP effectively cuts flare light of a middle image height generated significantly upon attaining a large aperture ratio, and high optical performance is obtained over the entire zoom range.

The lens configuration of the fourth exemplary embodiment is similar to that of the first exemplary embodiment. As in the third exemplary embodiment, the aperture stop SP moves and the maximum diameter thereof is controlled during zooming.

In the fifth exemplary embodiment, the first lens unit L1 includes a cemented lens obtained by joining a negative lens of a meniscus shape with its convex surface facing the object side, and a biconvex positive lens with stronger curvature on the object side than on the image side. The first lens unit L1 further includes a positive lens of a meniscus shape with its convex surface facing the object side. That is, the first lens unit L1 includes three lenses in total. With this configuration, at the telephoto end, chromatic aberration and changes in lateral chromatic aberration caused by zooming are corrected, and a high zoom ratio of 14 or more is achieved. The second lens unit L2 includes three lenses, i.e., in order from the object side, a negative lens of a meniscus shape with its concave surface facing the image side, a biconcave negative lens, and a positive lens of a meniscus shape with its convex surface facing the object side.

With this configuration, changes in various aberrations, such as lateral chromatic aberration, curvature of field, and astigmatism, caused by zooming are effectively corrected. The third lens unit L3 includes four lenses, i.e., in order from the object side, a positive lens G31 with curvature stronger on the object side than on the image side, a positive lens G32 having a lens configuration similar to that of the positive lens G31, a negative lens of a meniscus shape with its concave surface facing the image side, and a positive lens of a meniscus shape with its convex surface facing the image side. The fourth lens unit L4 includes a cemented lens obtained by joining a biconvex positive lens and a negative lens of a meniscus shape with its convex surface facing the image side, and thus suppresses changes in axial chromatic aberration and lateral chromatic aberration caused by focusing.

The aperture stop SP is arranged on the object side of the third lens unit L3, and does not move during zooming. A desired F-number can be obtained at each zoom position by changing the maximum diameter of the aperture stop SP depending on the zoom position.

In the sixth exemplary embodiment, the first lens unit L1 has a lens configuration similar to that of the fifth exemplary embodiment. The second lens unit L2 includes three lenses, i.e., a biconcave negative lens with curvature stronger on the image side than on the object side, a biconcave negative lens with curvature stronger on the object side than on the image side, and a biconvex positive lens. This configuration effectively corrects changes in various aberrations, such as lateral chromatic aberration, curvature of field, and astigmatism, caused by zooming. Although the configurations of the third lens unit L3 and the aperture stop SP are similar to those of the second exemplary embodiment, the positive lens arranged closest to the image plane has a biconvex shape.

This increases a sharing ratio of positive refractive power, increases positive refractive power of the third lens unit L3, and achieves a high zoom ratio of about 10. The fourth lens unit L4 includes a negative lens of a meniscus shape with its convex surface facing the image side. The fourth lens unit L4 has a zooming function by moving to increase the distance from the third lens unit L3 during zooming from the wide-angle end to the telephoto end, and thus a high zoom ratio is obtained.

The fifth lens unit L5 includes a cemented lens obtained by joining a biconvex positive lens and a negative lens of a meniscus shape with its convex surface facing the image side, and thus suppresses changes in axial chromatic aberration and lateral chromatic aberration caused by focusing. Note that the fourth lens unit L4 may perform focusing.

In the first to fourth and sixth exemplary embodiments, an image height near the wide-angle end may be set to differ from those at other zoom positions. By doing so, an effective diameter of a lens unit on the object side of the aperture stop SP can be reduced, thus making the lens system compact. Since the zoom lens has negative distortion near the wide-angle end, barrel-shaped distortion occurs on the image plane. In this case, an image formation point on the image plane relative to the object point is located at an image height lower than an ideal image height. This difference in position of the image formation point may be electrically corrected to reduce distortion.

Note that an image formation position may be moved in a direction perpendicular to the optical axis by entirely or partially moving the third lens unit L3 in a direction having a component perpendicular to the optical axis. That is, an image shake of a photographed image may be corrected. In the sixth exemplary embodiment, an image shake of a photographed image may be corrected by moving the fourth lens unit L4 in a direction having a component perpendicular to the optical axis.

As mentioned above, according to each exemplary embodiment, a zoom lens having high optical performance can be obtained, with the entire zoom lens being compact. This zoom lens also has a high zoom ratio and a bright Fno over the entire zoom range.

An exemplary embodiment of a digital camera (image pickup apparatus) using the zoom lens according to an exemplary embodiment of the present invention as a photographic optical system will be described below with reference to FIG. 13. FIG. 13 illustrates a digital camera body 20, a photographic optical system 21 constituted by the zoom lens according to the above exemplary embodiments, an image sensor (photoelectric conversion element) 22 such as a CCD sensor configured to receive an object image (image) formed by the photographic optical system 21, a recording unit 23 configured to record the object image received by the image sensor 22, and a viewfinder 24 for observing an object image displayed on a display element (not illustrated).

The above-mentioned display element includes a liquid crystal panel, for example, and an object image formed on the image sensor 22 is displayed thereon. By applying the zoom lens according to an exemplary embodiment of the present invention to an image pickup apparatus such as a digital camera in this manner, a compact image pickup apparatus having high optical performance is realized.

The zoom lens according to each exemplary embodiment of the present invention is also applicable to a mirrorless non-reflex camera without a quick-return mirror.

Specific numerical data of numerical examples 1 to 6 respectively corresponding to the first to sixth exemplary embodiments will be listed below. In the numerical examples, i denotes the number of a surface counted from the object side. ri denotes a radius of curvature of the i-th optical surface (i-th surface). di denotes an axial distance between the i-th surface and the (i+1)th surface. ndi and vdi denote a refractive index and an Abbe number, respectively, of the material of the i-th optical member at the d-line. Two surfaces closest to the image side correspond to the glass block G. When an X axis is assumed in an optical axis direction, an H axis is assumed in a direction perpendicular to the optical axis, the traveling direction of light is positive, R represents a paraxial radius of curvature, K represents a conic constant, and A4 to A12 each represent an aspheric coefficient, the aspheric shape is expressed by:

$$X = \frac{\frac{H^2}{R}}{1+\sqrt{1-(1+K)\left(\frac{H}{R}\right)^2}} + A3H^3 + A4H^4 + A5H^5 + A6H^6 + A7H^7 + A8H^8 + A9H^9 + A10H^{10} + A12H^{12}$$

an asterisk "*" next to a surface number is indicative of a surface having an aspheric shape. The notation "e−x" means $10^{-x}$. BF is a back focus and represents an air-equivalent distance from the last lens surface to the image plane. Relations between the above-mentioned conditions and the numerical examples are listed in Table 1. A half angle of view is the value calculated by ray tracing.

Numerical Example 1

Unit: mm

Surface data

| Surface number | r | d | nd | vd |
|---|---|---|---|---|
| 1 | 25.017 | 1.20 | 1.95906 | 17.5 |
| 2 | 18.420 | 5.11 | 1.83481 | 42.7 |
| 3 | 63.744 | (variable) | | |
| 4 | 31.426 | 0.90 | 1.88300 | 40.8 |
| 5 | 7.979 | 5.44 | | |
| 6 | −35.773 | 0.70 | 1.71300 | 53.9 |
| 7 | 21.040 | 0.89 | | |
| 8 | 16.642 | 1.74 | 2.00272 | 19.3 |
| 9 | 40.798 | (variable) | | |
| 10 (stop) | ∞ | 0.80 | | |
| 11* | 11.210 | 3.05 | 1.69350 | 53.2 |
| 12* | −24.997 | 0.20 | | |
| 13* | 13.695 | 2.25 | 1.49710 | 81.6 |
| 14 | −68.097 | 0.60 | 1.69895 | 30.1 |
| 15 | 7.740 | 1.99 | | |
| 16 | −12.068 | 1.25 | 1.59522 | 67.7 |
| 17 | −8.906 | (variable) | | |
| 18 | 17.981 | 3.06 | 1.91082 | 35.3 |
| 19 | −21.166 | 0.60 | 1.92286 | 18.9 |
| 20 | 61.333 | (variable) | | |
| 21 | ∞ | 1.10 | 1.51633 | 64.1 |
| 22 | ∞ | 0.60 | | |
| Image plane | ∞ | | | |

Aspheric surface data

11th surface

K = 4.26209e−001  A4 = −2.04663e−004  A6 = −2.18028e−006
A8 = −7.37121e−008  A10 = 2.71327e−009

12th surface

K = 0.00000e+000  A4 = 8.02434e−005  A6 = −3.85411e−006
A8 = 1.39289e−007

13th surface

K = −1.23460e−001  A4 = 4.96525e−005  A6 = −6.32488e−008
A8 = 1.84140e−007  A10 = 1.61498e−009

Unit: mm

Various data
Zoom ratio: 4.79

| | Wide-angle | Middle | Telephoto |
|---|---|---|---|
| Focal length | 6.24 | 13.68 | 29.89 |
| F-number | 1.75 | 2.16 | 2.84 |
| Half angle of view (degree) | 37.26 | 19.25 | 8.79 |
| Image height | 4.28 | 4.65 | 4.65 |
| Total lens length | 60.18 | 60.04 | 73.55 |
| BF | 7.15 | 10.22 | 8.06 |
| d3 | 0.29 | 8.61 | 17.34 |
| d9 | 19.29 | 6.77 | 2.50 |
| d17 | 3.68 | 4.67 | 15.87 |
| d20 | 5.82 | 8.90 | 6.74 |

Zoom lens unit data

| Unit | Start surface | Focal length |
|---|---|---|
| 1 | 1 | 49.70 |
| 2 | 4 | −9.69 |
| 3 | 10 | 15.39 |
| 4 | 18 | 27.37 |

Numerical Example 2

Surface data

| Surface number | r | d | nd | vd |
|---|---|---|---|---|
| 1 | 28.118 | 1.00 | 1.95906 | 17.5 |
| 2 | 20.642 | 5.31 | 1.88300 | 40.8 |
| 3 | 85.837 | (variable) | | |
| 4 | 44.702 | 0.70 | 1.91082 | 35.3 |
| 5 | 8.129 | 5.02 | | |
| 6 | −31.250 | 0.50 | 1.65160 | 58.5 |
| 7 | 22.121 | 1.41 | | |
| 8 | 18.405 | 1.70 | 2.10205 | 16.8 |
| 9 | 41.248 | (variable) | | |
| 10* | 12.509 | 2.86 | 1.77250 | 49.5 |
| 11* | −31.063 | 0.90 | | |
| 12 (stop) | ∞ | 0.90 | | |
| 13* | 14.758 | 2.29 | 1.59522 | 67.7 |
| 14 | −25.169 | 0.50 | 1.85478 | 24.8 |
| 15 | 9.512 | 1.76 | | |
| 16 | −13.012 | 1.72 | 1.49700 | 81.5 |
| 17 | −8.103 | (variable) | | |
| 18 | 17.073 | 2.75 | 1.91082 | 35.3 |
| 19 | −66.870 | 0.50 | 1.95906 | 17.5 |
| 20 | 84.668 | (variable) | | |
| 21 | ∞ | 1.10 | 1.51633 | 64.1 |
| 22 | ∞ | 0.50 | | |
| Image plane | ∞ | | | |

Aspheric surface data

10th surface

K = 7.25807e−001  A4 = −1.37243e−004  A6 = −8.01701e−007
A8 = 2.27348e−008  A10 = −1.21095e−010

11th surface

K = 0.00000e+000  A4 = −2.76945e−005  A6 = 2.79454e−006
A8 = −1.45975e−008

13th surface

K = 0.00000e+000  A4 = −2.09870e−004  A6 = 5.04476e−006
A8 = −8.20527e−008

-continued

| Various data Zoom ratio: 4.79 | | | |
|---|---|---|---|
| | Wide-angle | Middle | Telephoto |
| Focal length | 6.24 | 13.38 | 29.89 |
| F-number | 1.80 | 2.10 | 2.60 |
| Half angle of view (degree) | 37.26 | 19.48 | 8.83 |
| Image height | 4.28 | 4.65 | 4.65 |
| Total lens length | 58.47 | 57.04 | 71.09 |
| BF | 6.61 | 10.69 | 10.44 |
| d3 | 0.69 | 7.80 | 17.49 |
| d9 | 17.65 | 5.08 | 0.60 |
| d17 | 3.71 | 3.66 | 12.74 |
| d20 | 5.38 | 9.46 | 9.22 |

| Zoom lens unit data | | |
|---|---|---|
| Unit | Start surface | Focal length |
| 1 | 1 | 47.03 |
| 2 | 4 | −9.16 |
| 3 | 10 | 15.15 |
| 4 | 18 | 23.60 |

Numerical Example 3

| Surface data | | | | |
|---|---|---|---|---|
| Surface number | r | d | nd | vd |
| 1 | 30.651 | 0.95 | 1.92286 | 18.9 |
| 2 | 21.617 | 4.33 | 1.83481 | 42.7 |
| 3 | 121.208 | (variable) | | |
| 4 | 62.677 | 0.70 | 1.77250 | 49.6 |
| 5 | 9.091 | 2.45 | | |
| 6 | 17.177 | 0.70 | 1.77250 | 49.6 |
| 7 | 11.108 | 3.33 | | |
| 8 | −29.145 | 0.70 | 1.48749 | 70.2 |
| 9 | 84.910 | 0.20 | | |
| 10 | 15.490 | 1.27 | 1.95906 | 17.5 |
| 11 | 26.324 | (variable) | | |
| 12 (stop) | ∞ | (variable) | | |
| 13* | 10.918 | 2.94 | 1.77250 | 49.5 |
| 14* | −33.882 | 0.33 | | |
| 15* | 12.812 | 2.22 | 1.55332 | 71.7 |
| 16 | 83.724 | 0.75 | 1.84666 | 23.8 |
| 17 | 7.166 | 1.80 | | |
| 18 | −15.794 | 1.60 | 1.49700 | 81.5 |
| 19 | −9.238 | (variable) | | |
| 20* | 15.678 | 1.97 | 1.76802 | 49.2 |
| 21* | 46.933 | (variable) | | |
| 22 | ∞ | 1.00 | 1.51633 | 64.1 |
| 23 | ∞ | 0.50 | | |
| Image plane | ∞ | | | |

| Aspheric surface data |
|---|
| 13th surface |

K = −1.42878e−001  A4 = −1.25915e−004  A6 = −3.49292e−007
A8 = −7.40222e−008

14th surface

K = 0.00000e+000  A4 = 1.33133e−004  A6 = −3.34080e−006
A8 = −1.70725e−008

15th surface

K = 1.13028e−001  A4 = 1.17210e−004  A6 = −2.72800e−006
A8 = 9.52315e−008

20th surface

K = 0.00000e+000  A4 = −5.22690e−005  A6 = −4.69782e−007
A8 = 4.14261e−008  A10 = −1.55541e−010

21st surface

K = 0.00000e+000  A4 = −7.74213e−005  A6 = −3.72845e−007
A8 = 4.05018e−008

| Various data Zoom ratio: 4.82 | | | |
|---|---|---|---|
| | Wide-angle | Middle | Telephoto |
| Focal length | 6.20 | 13.63 | 29.86 |
| F-number | 1.85 | 2.30 | 2.88 |
| Half angle of view (degree) | 37.11 | 19.00 | 8.76 |
| Image height | 4.23 | 4.65 | 4.65 |
| Total lens length | 59.94 | 59.57 | 70.58 |
| BF | 7.13 | 9.91 | 8.32 |
| d3 | 0.40 | 9.23 | 18.87 |
| d11 | 20.57 | 7.08 | 2.85 |
| d12 | 1.59 | 1.74 | 0.60 |
| d19 | 4.00 | 5.36 | 13.69 |
| d21 | 5.97 | 8.76 | 7.16 |

| Zoom lens unit data | | |
|---|---|---|
| Unit | Start surface | Focal length |
| 1 | 1 | 50.67 |
| 2 | 4 | −10.42 |
| 3 | 13 | 15.10 |
| 4 | 20 | 29.84 |

Numerical Example 4

| Surface data | | | | |
|---|---|---|---|---|
| Surface number | r | d | nd | vd |
| 1 | 25.130 | 1.00 | 1.95906 | 17.5 |
| 2 | 19.602 | 5.10 | 1.81600 | 46.6 |
| 3 | 79.701 | (variable) | | |
| 4 | 38.809 | 0.80 | 1.95874 | 32.3 |
| 5 | 8.910 | 5.16 | | |
| 6 | −41.275 | 0.60 | 1.65160 | 58.5 |
| 7 | 16.248 | 1.35 | | |
| 8 | 17.094 | 1.96 | 1.95906 | 17.5 |
| 9 | 51.725 | (variable) | | |
| 10 (stop) | ∞ | (variable) | | |
| 11* | 10.012 | 3.64 | 1.82080 | 42.7 |
| 12* | −35.342 | 0.20 | | |
| 13* | 21.915 | 2.19 | 1.59522 | 67.7 |
| 14 | −23.835 | 0.60 | 1.84666 | 23.9 |
| 15 | 8.669 | 2.14 | | |
| 16 | −11.751 | 1.42 | 1.49700 | 81.5 |
| 17 | −7.718 | (variable) | | |
| 18 | 15.011 | 2.63 | 1.91082 | 35.3 |
| 19 | −89.579 | 0.60 | 1.95906 | 17.5 |
| 20 | 39.342 | (variable) | | |
| 21 | ∞ | 1.10 | 1.51633 | 64.1 |
| 22 | ∞ | 0.50 | | |
| Image plane | ∞ | | | |

| Aspheric surface data |
|---|
| 11th surface |

K = 6.78386e−001  A4 = −1.00803e−004  A6 = −2.30352e−006
A8 = 6.98164e−008  A10 = −2.44475e−009  A12 = 2.26698e−011

12th surface

K = 0.00000e+000  A4 = 6.50217e−005  A6 = 9.59061e−007
A8 = 2.19062e−008  A10 = −2.68783e−010

-continued

13th surface

K = 0.00000e+000  A4 = −3.18719e−004  A6 = −1.08089e−006
A8 = 3.22456e−008

Various data
Zoom ratio: 4.00

|  | Wide-angle | Middle | Telephoto |
| --- | --- | --- | --- |
| Focal length | 6.00 | 12.10 | 24.00 |
| F-number | 1.53 | 2.00 | 2.28 |
| Half angle of view (degree) | 38.33 | 21.59 | 10.95 |
| Image height | 4.28 | 4.65 | 4.65 |
| Total lens length | 60.45 | 56.54 | 66.12 |
| BF | 6.23 | 8.94 | 8.10 |
| d3 | 0.30 | 5.64 | 14.48 |
| d9 | 17.96 | 6.58 | 1.90 |
| d10 | 3.05 | 1.18 | 1.43 |
| d17 | 3.51 | 4.82 | 10.82 |
| d20 | 5.00 | 7.71 | 6.88 |

Zoom lens unit data

| Unit | Start surface | Focal length |
| --- | --- | --- |
| 1 | 1 | 45.74 |
| 2 | 4 | −9.92 |
| 3 | 11 | 15.20 |
| 4 | 18 | 26.12 |

Numerical Example 5

Surface data

| Surface number | r | d | nd | vd |
| --- | --- | --- | --- | --- |
| 1 | 38.028 | 1.00 | 1.84666 | 23.9 |
| 2 | 21.290 | 4.00 | 1.60311 | 60.6 |
| 3 | −37187.686 | 0.20 |  |  |
| 4 | 19.811 | 2.60 | 1.69680 | 55.5 |
| 5 | 51.812 | (variable) |  |  |
| 6 | 32.230 | 0.60 | 1.88300 | 40.8 |
| 7 | 4.759 | 2.35 |  |  |
| 8 | −24.051 | 0.50 | 1.77250 | 49.6 |
| 9 | 18.543 | 0.34 |  |  |
| 10 | 9.377 | 1.20 | 1.95906 | 17.5 |
| 11 | 21.129 | (variable) |  |  |
| 12 (stop) | ∞ | 0.70 |  |  |
| 13* | 18.373 | 1.60 | 1.74330 | 49.3 |
| 14 | −342.165 | 0.52 |  |  |
| 15* | 11.071 | 2.00 | 1.49710 | 81.6 |
| 16 | −26.997 | 0.12 |  |  |
| 17 | 18.211 | 0.50 | 1.84666 | 23.9 |
| 18 | 8.561 | 2.01 |  |  |
| 19 | −10.177 | 1.20 | 1.48749 | 70.2 |
| 20 | −8.592 | (variable) |  |  |
| 21 | 19.233 | 1.80 | 1.80400 | 46.6 |
| 22 | −19.436 | 0.55 | 1.95906 | 17.5 |
| 23 | −49.560 | (variable) |  |  |
| 24 | ∞ | 1.94 | 1.51633 | 64.1 |
| 25 | ∞ | 0.50 |  |  |
| Image plane | ∞ |  |  |  |

Aspheric surface data

13th surface

K = 1.69407e−001  A4 = −1.34721e−005  A6 = −3.98984e−006
A8 = −6.77875e−009

15th surface

K = 4.87468e−002  A4 = −3.00764e−004  A6 = 5.41178e−006

Various data
Zoom ratio: 14.62

|  | Wide-angle | Middle | Telephoto |
| --- | --- | --- | --- |
| Focal length | 4.21 | 16.22 | 61.62 |
| F-number | 1.70 | 2.60 | 2.80 |
| Half angle of view (degree) | 29.08 | 7.88 | 2.08 |
| Image height | 2.25 | 2.25 | 2.25 |
| Total lens length | 59.14 | 59.14 | 59.14 |
| BF | 7.85 | 12.14 | 6.05 |
| d5 | 0.65 | 13.24 | 19.73 |
| d11 | 19.88 | 7.29 | 0.80 |
| d20 | 6.96 | 2.67 | 8.76 |
| d23 | 6.07 | 10.36 | 4.27 |

Zoom lens unit data

| Unit | Start surface | Focal length |
| --- | --- | --- |
| 1 | 1 | 30.56 |
| 2 | 6 | −5.67 |
| 3 | 12 | 15.29 |
| 4 | 21 | 19.04 |

Numerical Example 6

Surface data

| Surface number | r | d | nd | vd |
| --- | --- | --- | --- | --- |
| 1 | 31.941 | 0.70 | 1.84666 | 23.9 |
| 2 | 21.494 | 3.00 | 1.49700 | 81.5 |
| 3 | 389.497 | 0.13 |  |  |
| 4 | 25.287 | 2.00 | 1.69680 | 55.5 |
| 5 | 105.488 | (variable) |  |  |
| 6 | −160.176 | 0.40 | 1.91082 | 35.3 |
| 7 | 6.231 | 2.61 |  |  |
| 8 | −12.525 | 0.40 | 1.80400 | 46.6 |
| 9 | 38.481 | 0.36 |  |  |
| 10 | 22.729 | 1.35 | 1.95906 | 17.5 |
| 11 | −37.936 | (variable) |  |  |
| 12* | 9.983 | 1.81 | 1.80139 | 45.5 |
| 13 | −315.230 | 0.92 |  |  |
| 14 (stop) | ∞ | 0.95 |  |  |
| 15* | 18.601 | 1.28 | 1.43700 | 95.1 |
| 16 | 966.804 | 0.50 | 1.84666 | 23.9 |
| 17 | 8.748 | 0.32 |  |  |
| 18 | 14.589 | 2.15 | 1.59522 | 67.7 |
| 19 | −9.676 | (variable) |  |  |
| 20 | −8.119 | 0.40 | 1.59522 | 67.7 |
| 21 | −20.290 | (variable) |  |  |
| 22 | 25.112 | 2.10 | 1.78800 | 47.4 |
| 23 | −15.972 | 0.50 | 1.92286 | 18.9 |
| 24 | −27.452 | (variable) |  |  |
| 25 | ∞ | 0.80 | 1.51633 | 64.1 |
| 26 | ∞ | 0.50 |  |  |
| Image plane | ∞ |  |  |  |

Aspheric surface data

12th surface

K = −2.83813e+000  A4 = 2.11053e−004  A6 = −6.51880e−007
A8 = −2.08564e−007  A10 = 5.60738e−009  A12 = −2.15153e−011

15th surface

K = 2.98580e+000  A4 = −1.50771e−004  A6 = −6.94081e−006
A8 = 9.59172e−007  A10 = −2.42917e−008

-continued

Various data
Zoom ratio: 10.01

|  | Wide-angle | Middle | Telephoto |
|---|---|---|---|
| Focal length | 4.62 | 14.88 | 46.20 |
| F-number | 1.85 | 2.47 | 3.30 |
| Half angle of view (degree) | 38.85 | 13.80 | 4.45 |
| Image height | 3.10 | 3.63 | 3.63 |
| Total lens length | 48.77 | 53.91 | 64.59 |
| BF | 6.77 | 11.50 | 5.72 |
| d5 | 1.03 | 9.39 | 18.46 |
| d11 | 14.98 | 3.59 | 0.80 |
| d19 | 1.65 | 3.03 | 5.82 |
| d21 | 2.46 | 4.52 | 11.91 |
| d24 | 5.75 | 10.48 | 4.69 |

Zoom lens unit data

| Unit | Start surface | Focal length |
|---|---|---|
| 1 | 1 | 33.64 |
| 2 | 6 | −6.10 |
| 3 | 12 | 10.22 |
| 4 | 20 | −23.02 |
| 5 | 22 | 18.04 |

TABLE 1

| Condi-tions | Numerical Examples | | | | | |
|---|---|---|---|---|---|---|
|  | 1 | 2 | 3 | 4 | 5 | 6 |
| (1) | 1.694 | 1.773 | 1.773 | 1.821 | 1.743 | 1.801 |
| (2) | 81.6 | 67.7 | 71.7 | 67.7 | 81.6 | 95.1 |
| (3) | 0.579 | 0.578 | 0.576 | 0.578 | 0.579 | 0.581 |
| (4) | 0.916 | 0.789 | 0.999 | 1.088 | 0.309 | 0.499 |
| (5) | 2.469 | 2.430 | 2.435 | 2.533 | 3.627 | 2.212 |
| (6) | −0.801 | −0.745 | −0.850 | −1.047 | −0.333 | −0.292 |
| (7) | 0.0111 | 0.0039 | 0.0096 | 0.0014 | 0.0020 | 0.0040 |
| (8) | 0.0021 | 0.0025 | 0.0013 | 0.0089 | 0.0052 | 0.0003 |
| (9) | 0.324 | 0.306 | 0.349 | 0.413 | 0.092 | 0.132 |
| (10) | 1.663 | 1.573 | 1.697 | 1.906 | 0.496 | 0.728 |
| (11) | 0.365 | 0.365 | 0.385 | 0.383 | 0.116 | 0.185 |
| (12) | 2.082 | 2.145 | 2.129 | 1.915 | 16.556 | 3.897 |
| (13) | 1.523 | 1.242 | 1.696 | 2.074 | 0.153 | 0.765 |
| (14) | 4.574 | 1.889 | 5.254 | 0.756 | 0.832 | 7.321 |
| (15) | 0.608 | 0.590 | 0.563 | 0.794 | 0.588 | 0.477 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-169521 filed Jul. 31, 2012, which is hereby incorporated by reference herein in its entirety.

What is claimed is:

1. A zoom lens comprising, in order from an object side to an image side:
a first lens unit having positive refractive power;
a second lens unit having negative refractive power;
a third lens unit having positive refractive power; and
a rear lens group including one or more lens units,
wherein, at a telephoto end compared with a wide-angle end, a distance between the first lens unit and the second lens unit becomes larger, a distance between the second lens unit and the third lens unit becomes smaller, and a distance between the third lens unit and the rear lens group changes,
wherein the rear lens group has positive refractive power in an entire zoom range from the wide-angel end to the telephoto end, and an aperture stop is arranged between a lens surface of the second lens unit closest to the image side and a lens surface of the third lens unit closest to the image side,
wherein the third lens unit includes, in order from the object side to the image side, a first positive lens including an aspheric surface, a second positive lens including an aspheric surface, and a negative lens, and
wherein, when a refractive index of a material of the first positive lens at d-line is nd31, and an Abbe number and relative partial dispersion of a material of the second positive lens are vd32 and θgF32, respectively, conditions below are satisfied:

$nd31 > 1.63$ $vd32 > 63.0$ $\theta gF32 + 0.005 \cdot vd32 > 0.5675.$

2. The zoom lens according to claim 1, wherein, when a focal length of the entire zoom lens at the telephoto end is ft, and a focal length of the rear lens group at the telephoto end is fR, a condition below is satisfied:

$0.1 < fR/ft < 1.5$

3. The zoom lens according to claim 1, wherein the first positive lens has a biconvex shape.

4. The zoom lens according to claim 1, wherein the third lens unit includes three or more positive lenses.

5. The zoom lens according to claim 1, wherein, when a focal length of the entire zoom lens at the wide-angle end is fw, and a focal length of the third lens unit is f3, a condition below is satisfied:

$1.2 < f3/fw < 5.0$

6. The zoom lens according to claim 1, wherein, when a focal length of the second lens unit is f2, a focal length of the third lens unit is f3, a focal length of the entire zoom lens at the wide-angle end is fw, and a focal length of the entire zoom lens at the telephoto end is ft, a condition below is satisfied:

$-1.3 < (f2 \cdot f3)/(fw \cdot ft) < -0.1$

7. The zoom lens according to claim 1, wherein, when a focal length of the first positive lens in the third lens unit is f31, a lens surface of the first positive lens on the object side has a convex and aspheric shape in which positive refractive power becomes weaker in a direction away from an optical axis, and, at a maximum incident height at which an axial ray or an off-axis ray passes through the lens surface of the first positive lens on the object side during zooming from the wide-angle end to the telephoto end, a difference of a sag of a paraxial radius of curvature of the lens surface of the first positive lens on the object side from a sag of the aspheric shape is Sag1a, a condition below is satisfied:

$0.0008 < Sag1a/f31 < 0.0200$

8. The zoom lens according to claim 1, wherein, when a focal length of the second positive lens in the third lens unit is f32, a lens surface of the second positive lens on the object side has a convex and aspheric shape, and, at a maximum incident height at which an axial ray or an off-axis ray passes through the lens surface of the second positive lens on the object side during zooming from the wide-angle end to the telephoto end, a difference of a sag of a paraxial radius of curvature of the lens surface of the second positive lens on the object side from a sag of the aspheric shape is Sag2a, a condition below is satisfied:

$$0.0001 < |Sag2a|/f3^2 < 0.0120$$

9. The zoom lens according to claim 1, wherein, when a focal length of the second lens unit is f2, and a focal length of the entire zoom lens at the telephoto end is ft, a condition below is satisfied:

$$0.03 < |f2|/ft < 0.60$$

10. The zoom lens according to claim 1, wherein, when a focal length of the first lens unit is f1, and a focal length of the entire zoom lens at the telephoto end is ft, a condition below is satisfied:

$$0.2 < f1/ft < 2.6$$

11. The zoom lens according to claim 1, wherein, when an F-number and a focal length of the entire zoom lens at the wide-angle end are Fnow and fw, respectively, and a focal length of the entire zoom lens at the telephoto end is ft, a condition below is satisfied:

$$0.05 < Fnow/(ft/fw) < 0.50$$

12. The zoom lens according to claim 1, wherein, when a lateral magnification of the second lens unit at the wide-angle end is β2w, and a lateral magnification of the second lens unit at the telephoto end is β2t, a condition below is satisfied:

$$1.5 < \beta 2t/\beta 2w < 25.0$$

13. The zoom lens according to claim 1, wherein, when a focal length of the first lens unit is f1, a focal length of the rear lens group at the telephoto end is fR, and a focal length of the entire zoom lens at the telephoto end is ft, a condition below is satisfied:

$$0.04 < (f1 \cdot fR)/ft^2 < 2.60$$

14. The zoom lens according to claim 1, wherein, when a lens surface of the first positive lens on the object side has a convex and aspheric shape in which positive refractive power becomes weaker in a direction away from an optical axis, and, at a maximum incident height at which an axial ray or an off-axis ray passes through the lens surface of the first positive lens on the object side during zooming from the wide-angle end to the telephoto end, a difference of a sag of a paraxial radius of curvature of the lens surface of the first positive lens on the object side from a sag of the aspheric shape is Sag1a, a lens surface of the second positive lens on the object side has a convex and aspheric shape, and, at a maximum incident height at which an axial ray or an off-axis ray passes through the lens surface of the second positive lens on the object side during zooming from the wide-angle end to the telephoto end, a difference of a sag of a paraxial radius of curvature of the lens surface of the second positive lens on the object side from a sag of the aspheric shape is Sag2a, and at a maximum incident height at which an axial ray or an off-axis ray passes through the lens surface of the first positive lens on the image side during zooming from the wide-angle end to the telephoto end, a difference of a sag of a paraxial radius of curvature of the lens surface of the first positive lens on the image side from a sag of the aspheric shape is Sag1b, and refractive indexes at d-line of materials of the first positive lens and the second positive lens of the third lens unit are nd31 and nd32, respectively, a condition below is satisfied:

$$0.2 < |Sag1a - Sag1b| \cdot (nd31-1)/(|Sag2a| \cdot (nd32-1)) < 15.0$$

15. The zoom lens according to claim 1, wherein a lens unit arranged closest to the image side moves with a locus convex toward the object side during zooming from the wide-angle end to the telephoto end.

16. The zoom lens according to claim 1, wherein the zoom lens forms an image on a solid-state image sensor.

17. An image pickup apparatus comprising:

a zoom lens; and a solid-state image sensor configured to receive an image formed by the zoom lens, wherein the zoom lens comprises, in order from an object side to an image side, a first lens unit having positive refractive power, a second lens unit having negative refractive power, a third lens unit having positive refractive power, and a rear lens group including one or more lens units, wherein, at a telephoto end compared with a wide-angle end, a distance between the first lens unit and the second lens unit becomes larger, a distance between the second lens unit and the third lens unit becomes smaller, and a distance between the third lens unit and the rear lens group changes, wherein the rear lens group has positive refractive power in an entire zoom range, and an aperture stop is arranged between a lens surface of the second lens unit closest to the image side and a lens surface of the third lens unit closest to the image side, wherein the third lens unit includes, in order from the object side to the image side, a first positive lens including an aspheric surface, a second positive lens including an aspheric surface, and a negative lens, and wherein, when a refractive index at d-line of a material of the first positive lens is nd31, and an Abbe number and relative partial dispersion of a material of the second positive lens are vd32 and θgF32, respectively, conditions below are satisfied:

$$nd31 > 1.63$$

$$vd32 > 63.0$$

$$\theta gF32 + 0.005 \cdot vd32 > 0.5675.$$

18. The image pickup apparatus according to claim 17, wherein, when an F-number of the entire zoom lens at the wide-angle end is Fnow, a maximum incident height at which an axial ray or an off-axis ray passes through the lens surface of the first positive lens on the object side of the third lens unit during zooming from the wide-angle end to the telephoto end is hgt31a, and a maximum light incident height at an image plane is Ymax, a condition below is satisfied:

$$0.3 < hgt31a/(Ymax \cdot Fnow) < 1.0$$

* * * * *